US011080666B2

(12) United States Patent
Renke et al.

(10) Patent No.: US 11,080,666 B2
(45) Date of Patent: Aug. 3, 2021

(54) OPEN TICKET PAYMENT HANDLING WITH BILL SPLITTING

(71) Applicant: Square, Inc., San Francisco, CA (US)

(72) Inventors: Christopher Philip Renke, San Francisco, CA (US); Michael Wells White, San Francisco, CA (US); Eric Dickeson Muller, San Francisco, CA (US); Mathew Wilson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 145 days.

(21) Appl. No.: 16/053,576

(22) Filed: Aug. 2, 2018

(65) Prior Publication Data

US 2018/0341933 A1    Nov. 29, 2018

Related U.S. Application Data

(63) Continuation of application No. 14/675,565, filed on Mar. 31, 2015, now Pat. No. 10,043,162.

(51) Int. Cl.
*G06Q 20/10* (2012.01)
*G06Q 20/20* (2012.01)
(Continued)

(52) U.S. Cl.
CPC ......... *G06Q 20/102* (2013.01); *G06Q 20/045* (2013.01); *G06Q 20/204* (2013.01);
(Continued)

(58) Field of Classification Search
CPC .... G06Q 40/10; G06Q 40/02; G06Q 30/0236; G06Q 30/0267; G06Q 30/00;
(Continued)

(56) References Cited

U.S. PATENT DOCUMENTS

| 4,485,300 A | 11/1984 | Peirce |
| 5,980,089 A | 11/1999 | Weis |

(Continued)

OTHER PUBLICATIONS

Advisory Action dated May 29, 2019, for U.S. Appl No. 15/195,557, of Abrons, A., et al., filed Jun. 28, 2016.
(Continued)

*Primary Examiner* — Olusegun Goyea
(74) *Attorney, Agent, or Firm* — Lee & Hayes, P.C.

(57) ABSTRACT

A payment handling system may operate to handle payments for the cost of an open ticket transaction in which incremental authorization operations are performed. The payment handling system may receive items to add to the open ticket, payment instruments for paying the cost of the open ticket or adjustments to any bill splitting arrangement throughout the life of the open ticket. As items are added, payment instruments are received, and/or adjustments are input, the amount allocated to the one or more payments instruments may be updated. Incremental authorization values may be determined for some or all of the payment instruments. When the amount allocated to a payment instrument exceeds the incremental authorization value, an authorization of the instrument is attempted and a new authorization value is determined. At the end of the interaction, the open ticket is closed and payment is executed.

19 Claims, 12 Drawing Sheets

(51) Int. Cl.
    *G06Q 30/04* (2012.01)
    *G06Q 20/40* (2012.01)
    *G06Q 20/22* (2012.01)
    *G06Q 40/02* (2012.01)
    *G06Q 20/04* (2012.01)
    *G06Q 30/02* (2012.01)
    *G06Q 40/00* (2012.01)

(52) U.S. Cl.
    CPC ............ *G06Q 20/22* (2013.01); *G06Q 20/40* (2013.01); *G06Q 20/405* (2013.01); *G06Q 30/04* (2013.01); *G06Q 40/02* (2013.01); *G06Q 30/0236* (2013.01); *G06Q 30/0267* (2013.01); *G06Q 40/10* (2013.01)

(58) Field of Classification Search
    CPC ........ G06Q 20/32; G06Q 30/06; G06Q 10/02; G06Q 20/326; G06Q 20/18; G06Q 50/12; G06F 17/00; G06F 3/048; G06F 7/08
    USPC ..... 705/14.51, 14.64, 17, 30, 34, 35, 40, 44, 705/64, 26.43, 26.41, 5, 26.82; 235/381, 235/383, 375
    See application file for complete search history.

(56) References Cited

U.S. PATENT DOCUMENTS

| | | | |
|---|---|---|---|
| 6,373,950 B1 | 4/2002 | Rowney | |
| 6,473,740 B2 | 10/2002 | Cockrill et al. | |
| 6,727,925 B1 | 4/2004 | Bourdelais | |
| 6,732,934 B2 | 5/2004 | Hamilton et al. | |
| 6,920,431 B2 | 7/2005 | Showghi et al. | |
| 7,071,842 B1 | 7/2006 | Brady, Jr. | |
| 7,293,254 B2 * | 11/2007 | Bloesch ................ | G06F 9/4488 717/108 |
| 7,536,307 B2 | 5/2009 | Barnes et al. | |
| 7,571,468 B1 * | 8/2009 | Williams ............ | H04W 12/126 726/9 |
| 7,685,052 B2 | 3/2010 | Waelbroeck et al. | |
| 7,748,621 B2 | 7/2010 | Gusler et al. | |
| 7,756,745 B2 | 7/2010 | Leet et al. | |
| 7,797,204 B2 | 9/2010 | Balent | |
| 7,805,382 B2 | 9/2010 | Rosen et al. | |
| 7,942,337 B2 | 5/2011 | Jain | |
| 7,958,029 B1 | 6/2011 | Bobich et al. | |
| 8,069,085 B2 | 11/2011 | Ahlers et al. | |
| 8,123,370 B2 | 2/2012 | Maekawa | |
| 8,190,483 B2 | 5/2012 | Woycik et al. | |
| 8,260,723 B2 | 9/2012 | Carrott | |
| 8,370,207 B2 | 2/2013 | Edwards | |
| 8,380,177 B2 | 2/2013 | Laracey | |
| 8,671,002 B2 | 3/2014 | Stefik et al. | |
| 8,676,708 B1 | 3/2014 | Honey | |
| 8,688,574 B2 | 4/2014 | Stringfellow et al. | |
| 8,694,456 B2 | 4/2014 | Grigg et al. | |
| 8,700,659 B2 | 4/2014 | Skeen et al. | |
| 8,732,193 B2 | 5/2014 | Skeen et al. | |
| 8,738,451 B2 | 5/2014 | Ahlers et al. | |
| 8,762,207 B2 | 6/2014 | Kobres | |
| 8,799,111 B2 | 8/2014 | Prellwitz et al. | |
| 8,831,677 B2 | 9/2014 | Villa-Real | |
| 8,856,170 B2 | 10/2014 | Skeen et al. | |
| 8,862,504 B2 | 10/2014 | Sobek | |
| 8,875,990 B2 | 11/2014 | Bishop et al. | |
| 8,885,894 B2 | 11/2014 | Rowen et al. | |
| 8,977,567 B2 | 3/2015 | Aabye et al. | |
| 9,002,584 B2 | 4/2015 | Van Wiemeersch et al. | |
| 9,037,491 B1 | 5/2015 | Lee | |
| 9,064,359 B2 | 6/2015 | Lert, Jr. et al. | |
| 9,165,298 B2 | 10/2015 | Hayhow | |
| 9,195,982 B2 | 11/2015 | Orr et al. | |
| 9,218,413 B2 | 12/2015 | Skeen et al. | |
| 9,311,639 B2 | 4/2016 | Filler | |
| 9,342,823 B2 | 5/2016 | Casares et al. | |
| 9,349,108 B2 | 5/2016 | Skeen et al. | |
| 9,355,470 B2 | 5/2016 | Merrell et al. | |
| 9,390,424 B2 | 7/2016 | Hendrickson | |
| 9,409,978 B2 | 8/2016 | Doxsey et al. | |
| 9,426,183 B2 | 8/2016 | Shahidzadeh et al. | |
| 9,430,784 B1 | 8/2016 | Frederick et al. | |
| 9,444,932 B2 | 9/2016 | Ravenel et al. | |
| 9,477,995 B2 | 10/2016 | Nathanel et al. | |
| 9,515,999 B2 | 12/2016 | Ylonen | |
| 9,536,243 B2 | 1/2017 | Khan | |
| 9,563,890 B2 | 2/2017 | Zhou | |
| 9,569,757 B1 | 2/2017 | Wilson et al. | |
| 9,569,768 B2 | 2/2017 | Kean | |
| 9,576,285 B2 | 2/2017 | Zhou | |
| 9,576,289 B2 | 2/2017 | Henderson et al. | |
| 9,582,797 B1 | 2/2017 | Holmes et al. | |
| 9,633,344 B2 | 4/2017 | Nathanel et al. | |
| 9,666,023 B2 | 5/2017 | Irwin, Jr. | |
| 9,734,463 B2 | 8/2017 | Skeen et al. | |
| 9,785,930 B1 | 10/2017 | Terra et al. | |
| 9,799,028 B2 | 10/2017 | Dickelman | |
| 9,799,380 B2 | 10/2017 | Liabraaten | |
| 9,817,646 B1 | 11/2017 | Chen et al. | |
| 9,824,233 B2 | 11/2017 | Kaplan et al. | |
| 9,824,408 B2 | 11/2017 | Isaacson et al. | |
| RE46,731 E | 2/2018 | Woycik et al. | |
| 9,922,324 B2 | 3/2018 | Wilson et al. | |
| 9,934,784 B2 | 4/2018 | May et al. | |
| 9,940,374 B2 | 4/2018 | Orumchian et al. | |
| 9,959,529 B1 | 5/2018 | Varma et al. | |
| 9,965,755 B2 | 5/2018 | Richelson et al. | |
| 9,972,003 B2 | 5/2018 | Mooring, II et al. | |
| 10,002,397 B2 | 6/2018 | Rose | |
| 10,007,953 B1 | 6/2018 | Nathoo et al. | |
| 10,019,011 B1 | 7/2018 | Green et al. | |
| 10,019,149 B2 | 7/2018 | Chirakan et al. | |
| 10,019,698 B1 | 7/2018 | Scott et al. | |
| 10,026,062 B1 | 7/2018 | Sasmaz et al. | |
| 10,031,420 B2 | 7/2018 | Ongayi et al. | |
| 10,032,171 B2 | 7/2018 | Yeager | |
| 10,043,162 B1 | 8/2018 | Renke et al. | |
| 10,043,209 B2 | 8/2018 | Cooke et al. | |
| 10,055,722 B1 | 8/2018 | Chen et al. | |
| 10,068,225 B2 | 9/2018 | Barrett | |
| 10,068,272 B1 | 9/2018 | Varma et al. | |
| 10,074,148 B2 | 9/2018 | Cashman et al. | |
| 10,078,820 B2 | 9/2018 | Renke et al. | |
| 10,091,617 B2 | 10/2018 | Chicoine et al. | |
| 10,210,569 B1 | 2/2019 | Kim et al. | |
| 10,289,991 B1 | 5/2019 | Muller et al. | |
| 10,289,992 B1 | 5/2019 | Bell et al. | |
| 10,311,420 B1 | 6/2019 | Bell et al. | |
| 10,313,383 B2 | 6/2019 | Sommer | |
| 10,319,042 B2 | 6/2019 | Arvapally et al. | |
| 10,346,605 B2 | 7/2019 | Narasimhan | |
| 10,360,648 B1 | 7/2019 | Rocklin et al. | |
| 10,467,559 B1 | 11/2019 | Svenson et al. | |
| 10,528,945 B1 | 1/2020 | Renke et al. | |
| 10,580,062 B1 | 3/2020 | Abrons et al. | |
| 2003/0174823 A1 | 9/2003 | Justice et al. | |
| 2004/0243468 A1 | 12/2004 | Cohagan et al. | |
| 2005/0004843 A1 | 1/2005 | Heflin | |
| 2006/0143087 A1 | 6/2006 | Tripp et al. | |
| 2006/0178986 A1 * | 8/2006 | Giordano ............... | G06Q 20/20 705/40 |
| 2007/0018041 A1 | 1/2007 | Butler et al. | |
| 2007/0235533 A1 * | 10/2007 | Giordano ............... | G06Q 20/18 235/383 |
| 2008/0015987 A1 * | 1/2008 | Ramavarjula .......... | G06Q 40/00 705/44 |
| 2008/0313047 A1 * | 12/2008 | Casares .................. | G06Q 20/40 705/17 |
| 2008/0319914 A1 * | 12/2008 | Carrott ............. | G06Q 20/38215 705/75 |
| 2009/0063312 A1 * | 3/2009 | Hurst ................... | G06Q 20/206 705/30 |
| 2009/0065572 A1 * | 3/2009 | Jain ...................... | G06Q 20/401 235/379 |
| 2009/0083069 A1 | 3/2009 | Tierney et al. | |

(56) References Cited

U.S. PATENT DOCUMENTS

| | | | |
|---|---|---|---|
| 2009/0090783 A1* | 4/2009 | Killian | G06Q 20/3229 235/492 |
| 2009/0192913 A1* | 7/2009 | Saito | G06Q 20/3229 705/26.1 |
| 2009/0228336 A1* | 9/2009 | Giordano | G06Q 20/202 705/75 |
| 2009/0240624 A1 | 9/2009 | James et al. | |
| 2010/0010906 A1* | 1/2010 | Grecia | G06Q 20/405 705/21 |
| 2010/0088207 A1 | 4/2010 | McLaughlin et al. | |
| 2010/0174620 A1* | 7/2010 | Stringfellow | G06Q 20/227 705/26.1 |
| 2010/0217674 A1* | 8/2010 | Kean | G07F 7/10 705/17 |
| 2011/0022472 A1* | 1/2011 | Zon | G06Q 20/32 705/14.64 |
| 2011/0087592 A1* | 4/2011 | van der Veen | G06Q 20/227 705/44 |
| 2011/0191196 A1* | 8/2011 | Orr | G06Q 20/202 705/17 |
| 2011/0215159 A1* | 9/2011 | Jain | G06Q 20/3227 235/492 |
| 2011/0251892 A1* | 10/2011 | Laracey | G06Q 30/0253 705/14.51 |
| 2011/0251909 A1* | 10/2011 | Clark | G06Q 20/20 705/17 |
| 2011/0288967 A1* | 11/2011 | Selfridge | G06Q 40/12 705/30 |
| 2011/0320345 A1* | 12/2011 | Taveau | G06Q 20/3226 705/39 |
| 2012/0130787 A1* | 5/2012 | Stouffer | G06Q 30/0207 705/14.17 |
| 2012/0130899 A1 | 5/2012 | McMonagle et al. | |
| 2012/0136754 A1* | 5/2012 | Underwood | G06Q 50/12 705/26.43 |
| 2012/0209749 A1* | 8/2012 | Hammad | G06Q 20/204 705/27.1 |
| 2012/0330837 A1* | 12/2012 | Persaud | G06Q 20/405 705/44 |
| 2013/0132274 A1* | 5/2013 | Henderson | G06Q 20/4012 705/41 |
| 2013/0226805 A1* | 8/2013 | Griffin | G06Q 20/4037 705/44 |
| 2013/0238455 A1 | 9/2013 | Laracey | |
| 2014/0052586 A1* | 2/2014 | Weber | G06Q 30/06 705/26.82 |
| 2014/0097241 A1* | 4/2014 | Tovar | G07F 7/088 235/380 |
| 2014/0108237 A1 | 4/2014 | Carretta et al. | |
| 2014/0244409 A1* | 8/2014 | Nathanel | G06Q 30/02 705/15 |
| 2014/0258011 A1 | 9/2014 | Shore | |
| 2014/0263622 A1 | 9/2014 | Babatz et al. | |
| 2014/0279534 A1 | 9/2014 | Miles | |
| 2014/0351130 A1 | 11/2014 | Cheek et al. | |
| 2014/0372300 A1 | 12/2014 | Blythe | |
| 2015/0032567 A1 | 1/2015 | Bhatia | |
| 2015/0095225 A1 | 4/2015 | Appana et al. | |
| 2015/0178712 A1* | 6/2015 | Angrish | G06Q 10/02 705/5 |
| 2015/0213565 A1 | 7/2015 | Garrett et al. | |
| 2015/0242854 A1* | 8/2015 | Hayhow | G06Q 20/027 705/44 |
| 2015/0278789 A1 | 10/2015 | Richelson et al. | |
| 2015/0287006 A1 | 10/2015 | Hunter et al. | |
| 2016/0247113 A1 | 8/2016 | Rademaker | |
| 2016/0307151 A1* | 10/2016 | Grabovski | G06Q 20/202 |
| 2016/0307176 A1 | 10/2016 | Renke et al. | |
| 2016/0335613 A1 | 11/2016 | Laracey | |
| 2016/0353235 A1 | 12/2016 | Williams et al. | |
| 2017/0004475 A1 | 1/2017 | White et al. | |
| 2017/0018041 A1 | 1/2017 | Fox | |
| 2017/0083901 A1 | 3/2017 | Spencer, II | |
| 2017/0124671 A1 | 5/2017 | Tam et al. | |
| 2017/0161851 A1 | 6/2017 | Li et al. | |
| 2018/0039965 A1 | 2/2018 | Han et al. | |
| 2018/0089658 A1 | 3/2018 | Bell et al. | |
| 2018/0181937 A1 | 6/2018 | Wilson et al. | |
| 2018/0249861 A1 | 9/2018 | Hiatt et al. | |
| 2018/0271322 A1 | 9/2018 | Thai et al. | |
| 2018/0330346 A1 | 11/2018 | Grassadonia et al. | |
| 2018/0365663 A1 | 12/2018 | Bell et al. | |
| 2019/0228463 A1 | 7/2019 | Chan et al. | |
| 2020/0273086 A1 | 8/2020 | Abrons et al. | |

OTHER PUBLICATIONS

Notice of Allowance dated Jun. 24, 2019, for U.S. Appl. No. 15/721,522, of Svenson, T., et al., filed Sep. 29, 2017.
Non Final Office Action dated Jun. 28, 2019, for U.S. Appl. No. 15/195,557, of Abrons, A., et al., filed Jun. 28, 2016.
Notice of Allowance dated Aug. 14, 2019, for U.S. Appl. No. 14/675,555, of Renke, C.P., et al., filed Mar. 31, 2015.
Advisory Action dated Nov. 30, 2018, for U.S. Appl. No. 14/675,555, of Renke, C.P., et al., filed Mar. 31, 2015.
Notice of Allowance dated Dec. 11, 2018, for U.S. Appl. No. 15/905,643, of Wilson, M., et al., filed Feb. 26, 2018.
Notice of Allowance dated Dec. 28, 2018, for U.S. Appl. No. 15/185,383, of Bell, B., et al., filed Jun. 17, 2016.
Notice of Allowance dated Jan. 15, 2019, for U.S. Appl. No. 15/185,354, of Bell, B., et al., filed Jun. 17, 2016.
Advisory Action dated Jan. 24, 2019, for U.S. Appl. No. 14/675,555, of Renke, C.P., et al., filed Mar. 31, 2015.
Advisory Action dated Feb. 21, 2019, for U.S. Appl. No. 14/675,555, of Renke, C.P., et al., filed Mar. 31, 2015.
Notice of Allowance dated Mar. 6, 2019, for U.S. Appl. No. 15/189,131, of Rocklin, W., et al., filed Jun. 22, 2016.
Final Office Action dated Mar. 28, 2019, for U.S. Appl. No. 15/195,557, of Abrons, A., et al., filed Jun. 28, 2016.
Notice of Allowance dated Oct. 23, 2019, for U.S. Appl. No. 15/195,557, of Abrons, A., et al., filed Jun. 28, 2016.
Non Final Office Action dated Dec. 12, 2019, for U.S. Appl. No. 15/721,474, of Svenson, T., et al., filed Sep. 29, 2017.
Non Final Office Action dated Apr. 23, 2020, for U.S. Appl. No. 16/219,060, of Kyle, Callender, filed Dec. 13, 2018.
Mercury, "Bar Tabs and Credit Cards: The Mixology for POS Developers," Credit Card Acceptance Procedures When Supporting Bar Tabs, pp. 1-9 (May 29, 2014).
Non-Final Office Action dated Jun. 25, 2015, for U.S. Appl. No. 14/675,555, of Renke, C.P., et al., filed Mar. 31, 2015.
Final Office Action dated Dec. 31, 2015, for U.S. Appl. No. 14/675,555, of Renke, C.P., et al., filed Mar. 31, 2015.
Non Final Office Action dated Dec. 16, 2016, for U.S. Appl. No. 14/675,555, of Renke, C.P., et al., filed Mar. 31, 2015.
Non Final Office Action dated Jan. 18, 2017, for U.S. Appl. No. 14/675,565, of Renke, C.P., et al., filed Mar. 31, 2015.
Final Office Action dated Jul. 26, 2017, for U.S. Appl. No. 14/675,555, of Renke, C.P., et al., filed Mar. 31, 2015.
Advisory Action dated Nov. 8, 2017, for U.S. Appl. No. 14/675,555, of Renke, C.P., et al., filed Mar. 31, 2015.
Final Office Action dated Dec. 14, 2017, for U.S. Appl. No. 14/675,565, of Renke, C.P., et al., filed Mar. 31, 2015.
Non Final Office Action dated Feb. 27, 2018, for U.S. Appl. No. 14/675,555, of Renke, C.P., et al., filed Mar. 31, 2015.
Notice of Allowance dated Mar. 29, 2018, for U.S. Appl. No. 14/675,565, of Renke, C.P., et al., filed Mar. 31, 2015.
Non Final Office Action dated Jun. 19, 2018, for U.S. Appl. No. 15/905,643, of Wilson, M., et al., filed Feb. 26, 2018.
Non Final Office Action dated Aug. 14, 2018, for U.S. Appl. No. 15/185,354, of Bell, B., et al., filed Jun. 17, 2016.
Non Final Office Action dated Aug. 15, 2018, for U.S. Appl. No. 15/185,383, of Bell, B., et al., filed Jun. 17, 2016.
Final Office Action dated Sep. 4, 2018, for U.S. Appl. No. 14/675,555, of Renke, C.P., et al., filed Mar. 31, 2015.
Non Final Office Action dated Oct. 2, 2018, for U.S. Appl. No. 15/195,557, of Abrons, A., et al., filed Jun. 28, 2016.

(56) References Cited

OTHER PUBLICATIONS

Non Final Office Action dated Oct. 10, 2018, for U.S. Appl. No. 15/189,131, of Rocklin, W., et al., filed Jun. 22, 2016.
Notice of Allowance dated Oct. 5, 2020, for U.S. Appl. No. 16/219,060, of Kyle, C., filed Dec. 13, 2018.
Advisory Action dated Oct. 6, 2020, for U.S. Appl. No. 15/721,474, of Svenson, T., et al., filed Sep. 29, 2017.
Notice of Allowance dated Oct. 21, 2020, for U.S. Appl. No. 15/721,474, of Svenson, T., et al., filed Sep. 29, 2017.
Final Office Action dated Jun. 25, 2020, for U.S. Appl. No. 15/721,474, of Svenson, T., et al., filed Sep. 29, 2017.

* cited by examiner

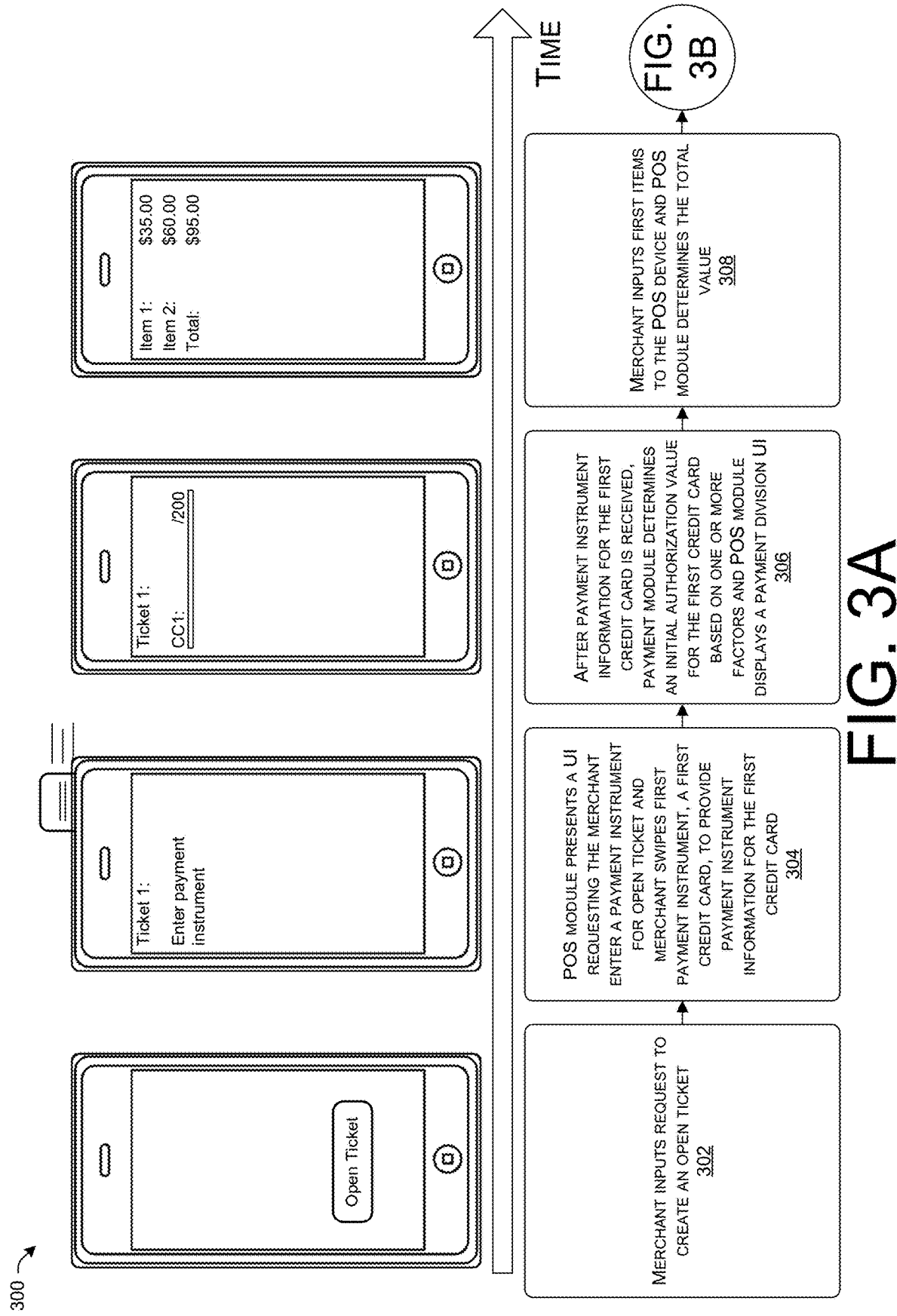

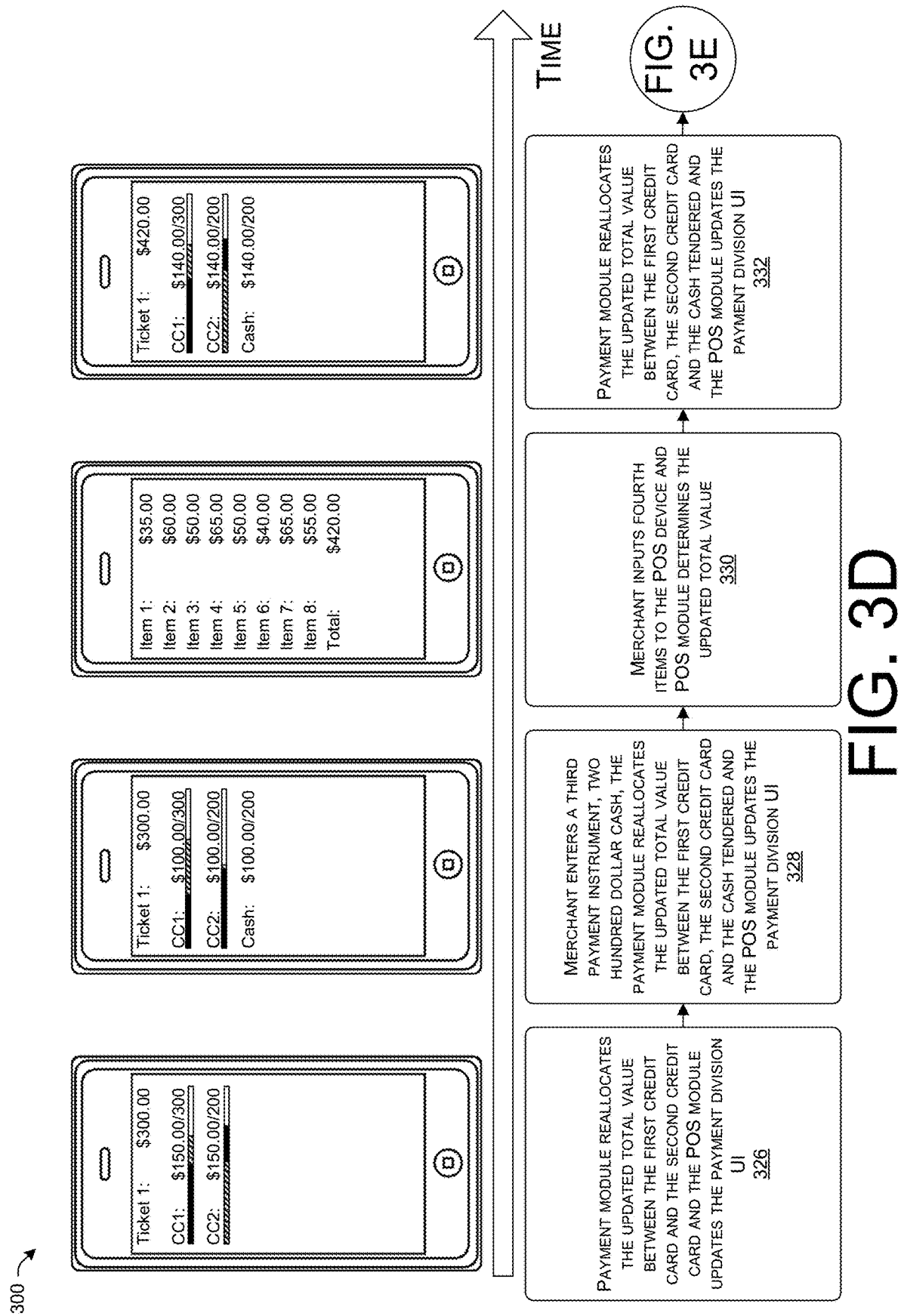

OPEN TICKET PAYMENT HANDLING WITH BILL SPLITTING

CROSS REFERENCE TO RELATED APPLICATION

This application is a continuation of and claims priority to U.S. patent application Ser. No. 14/675,565, entitled "OPEN TICKET PAYMENT HANDLING WITH BILL SPLITTING", filed on Mar. 31, 2015, the contents of which is incorporated herein by reference in its entirety.

BACKGROUND

In today's commerce, merchants often utilize an array of different point-of-sale (POS) devices, including mobile POS devices. Merchants may use these mobile POS devices to engage in transactions with customers at different locations. For instance, a waiter of a restaurant may use a mobile POS device to take and process customers' orders for food and drinks. In another example, a bartender may use a mobile POS device to charge a customer for items purchased over the course of a visit by the customer.

In some instances, the customers may wish to pay for items together and/or pay for items purchased over the course of a visit without paying multiple times. For example, multiple customers may wish to divide the check for a tab at a bar. In such instances, the merchant may have to perform multiple transactions and manually split the total in various ways. Further, as customers request additional items, the merchant's exposure to loss caused by non-payment on the open tab increases. On the other hand, constantly authorizing payment instruments of the customers as the tab grows may result in the merchant paying additional transaction fees, thereby reducing profits. These issues may cause errors, delay, inconvenience and loss of revenue.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIGS. 3A-3F are sequence diagrams illustrating the operations of bill splitting in a particular transaction executed by the system shown in FIG. 1.

DETAILED DESCRIPTION

Figure 1:
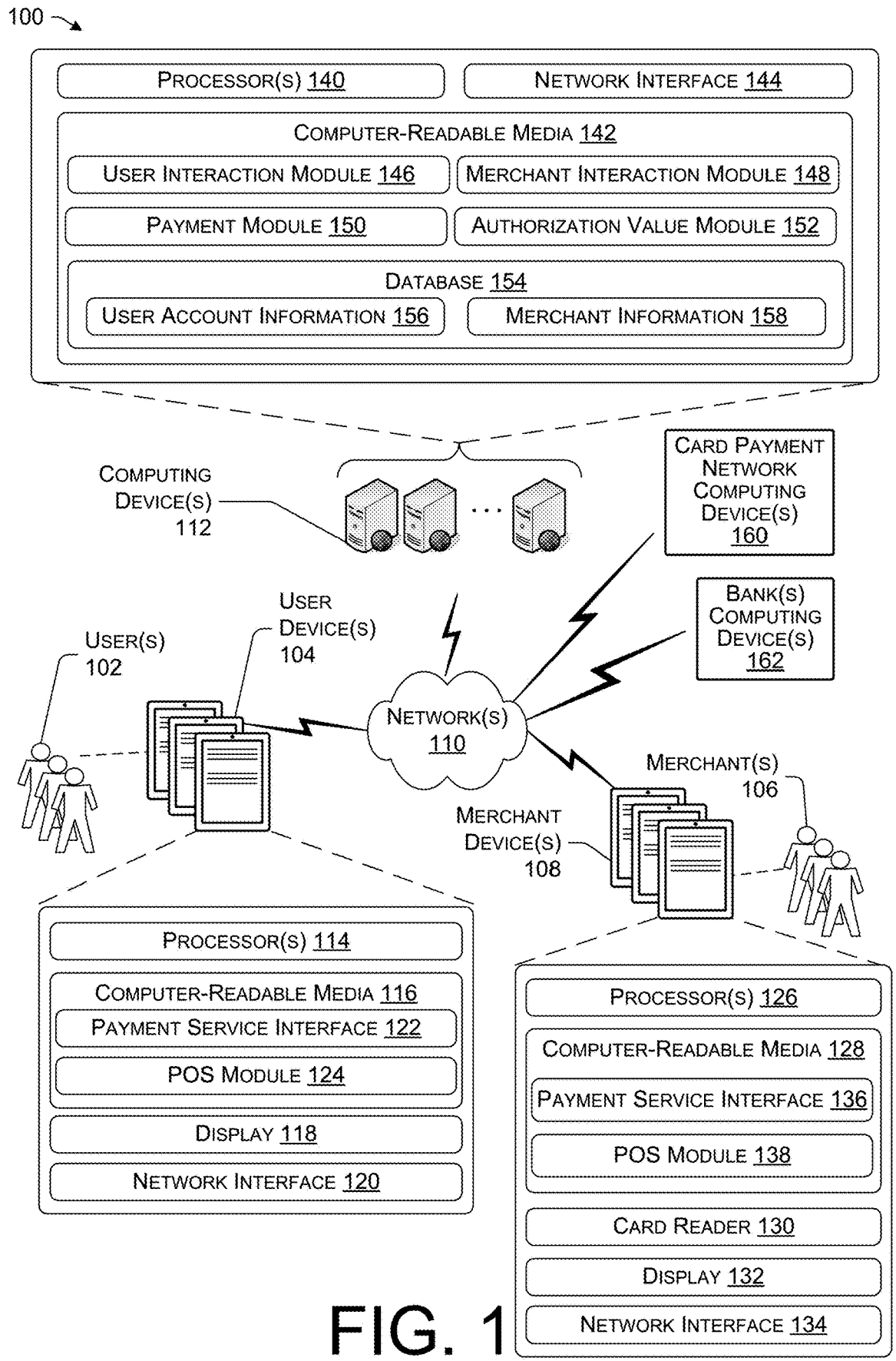
FIG. 1 illustrates an example system for handling payments among customers and merchants.

This disclosure describes systems and processes for handling payments for open tickets among customers and merchants. In some examples herein, the system may provide for handling incremental authorizations in open ticket transactions. For instance, the techniques herein may, when presented with a payment instrument, determine an authorization value at which to perform an authorization of the payment instrument. The determination of the authorization value may be based on a variety of factors, examples of which are discussed below.

In some examples herein, the system may provide bill splitting operations for open ticket transactions. For instance, the techniques herein may provide for handling the splitting of the cost of an open ticket transaction among one or more payment instruments. Some implementations of the systems and processes described herein may eliminate or reduce computation and/or complexities associated with bill splitting for merchants.

In some implementations, the merchant may input a request to the merchant device to create an open ticket. The merchant device may create the open ticket or, if the open ticket is maintained by a payment service, request that the payment service create the open ticket. After the ticket is created, the merchant may input information regarding one or more payment instruments of the customer. Based on various factors, the merchant device or payment service may determine authorization values for the one or more payment instruments. For example, an authorization value may be determined based on information known by the payment service about the customer, the type of the payment instrument, location information, and so on. Additional factors are discussed in more detail below. The authorization value is a value at which the merchant device or payment service requests authorization of a payment of the amount allocated to the payment instrument. However, the authorization does not complete the transaction. For example, in some instances, the authorization causes the indicated amount to be reserved to pay the cost of the transaction but does not cause the financial transaction to occur. Subsequent to an authorization, the financial transaction may be completed in a settlement step.

As indicated above, authorizations typically incur a cost or fee to the merchant or payment service. At the same time, if the merchant does not perform authorizations, the merchant has increased exposure to loss due to non-payment as each additional item is added to the open ticket. In some implementations according to this disclosure, the merchant device and/or payment service may perform authorizations on a payment instrument associated with the open tickets when the amount of the cost of the open ticket allocated to the payment instrument reaches an authorization value determined for the payment instrument.

For example, in a scenario in which a credit card has been assigned a fifty dollar authorization value, while the amount allocated to the credit card is less than fifty dollars, the merchant device and payment service do not perform authorization for the credit card unless the open ticket is to be closed. Once the amount allocated to the credit card reaches fifty dollars, the merchant device or payment service may connect to a card payment network to attempt to authorize the credit card for the amount allocated to the card. If the authorization is successful, the merchant device or payment service may then determine an updated or incremental authorization value at which the credit card may be reauthorized. In this manner, the amount of fees or costs associated with performing authorizations may be reduced without exposing the merchant to levels of risk traditionally caused by not authorizing a payment instrument for the cost of an open tab until the end of the interaction with the customer. Moreover, in some implementations, the payment service may provide a guarantee to the merchant that the payment service will cover any losses caused due to a payment instrument ultimately being declined for an amount less than an authorization value determined by the payment service for the payment instrument.

In some implementations, throughout the interaction with the customers associated with the open ticket, the merchant may input payment instruments to a merchant device of the merchant (e.g. swipe one or more credit cards) and the bill splitting operations described herein may automatically split a current cost of the open ticket transaction between the payment instruments without the merchant having to specifically allocate amounts to the instruments. On the other hand, the merchant may make adjustments to the bill splitting arrangement (e.g. in response to a customer asking for a payment instrument to be charged twenty dollars instead of an equal share of the bill).

Additional details and scenarios are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many. For example, though discussed herein in the context of a payment handling system, implementations are not so limited.

FIG. 1 illustrates an example system 100 for handling open ticket transactions and for processing payments among customers and merchants. More particularly, FIG. 1 provides a framework for payments from customers to merchants in which incremental authorization and/or bill splitting operations may occur in open ticket transactions. Additional details of incremental authorization and/or bill splitting operations are provided with respect to FIGS. 3A-4D.

As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116, a display 118 and a network interface 120. The computer-readable media 116 may store a payment service interface 122 and a POS module 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS module 138. The computing device(s) 112 may also include one or more processor(s) 140, computer-readable media 142 and a network interface 144. The computer readable media 142 may store a user interaction module 146, a merchant interaction module 148, a payment module 150, an authorization value module and a database 154.

In some implementations, one of the users 102 may operate a user device 104 to perform various functions associated with the user device 104. For example, a user of the user(s) 102 may utilize the user device 104, and particularly the payment service interface 122 thereof, to interact with the computing devices 112 via the network interface 120 to establish a user account with the payment service of the computing devices 112. In addition, a user of the user(s) 102 may utilize POS module 124 of the user device 104 to interface with the POS module 138 of the merchant device(s) 108, e.g. as part of a transaction using the payment service of the computing devices 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing devices 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS module 124 of the user device 104 to execute the payment from the user 102 to the merchant 106 through the payment service of the computing devices 112. Further, the POS module 138 may control the operation of the card reader 130 to read payment information from credit cards, debit cards, gift cards and the like. The POS module 138 may then utilize the information in operations for allocating portions of a transaction cost between a plurality of payment instruments. Moreover, the POS module 138 may operate to interact with the card payment network computing devices(s) 160 and/or bank(s) computing device(s) 162 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 to communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150, the authorization value module 152 and the database 154. The database 154 may store various information including user account information 156 and merchant information 158.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 154, such as the user account information 156 and merchant information 158 to provide handling of payments between merchants and users. In some implementations, user account information 156 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing devices 112. The merchant 106 can interact with the merchant device 108 to process the transaction. In some examples, the service of the computing devise 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing devices 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing devices 112. The user 102 can create the user account, for example, by interacting with an application of the user device 104 that is configured to perform electronic payment transactions and that may execute on the user device 104 (e.g. the payment service interface 122). When creating an electronic payment account with the service of the computing devices 112, the user 102 may provide an image including the face of the user, data describing a financial account of the user 102 (e.g., a credit card number, expiration date), and a billing address. This user information can be securely stored by the computing devices 112, for example, in the user account information 156 in the database 154. Further, the user account information 156 may be created for each user 102, which may include information about the user and transactions conducted by the user.

To accept electronic payments for POS transactions, the merchant 106 may create a merchant account with the service of the computing devices 112 by providing information describing the merchant including, for example, a merchant name, contact information, e.g., telephone numbers, the merchant's geographic location address, and one or more financial accounts to which funds collected from users will be deposited. This merchant information 158 can be securely stored by the service, for example, in the database 154 along with the user account information 156. Further, a merchant profile may be created for each merchant, which may include information about the merchant and transactions conducted by the merchant.

The service of the computing devices 112 may be configured to enable electronic payments for transactions. The computing devices 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment module 150 may be configured to send and receive data to and from the user device 104 and the merchant device 108. For example, the payment module 150 can be configured to send information describing merchants to an application on the user device 104 using, for example, the information stored in the database 154. For example, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108.

The computing devices 112 can also be configured to communicate with one or more computing devices 160 of a card payment network (e.g., MasterCard®, VISA®) over the one or more networks 110 to conduct financial transactions electronically. The computing devices 112 can also communicate with one or more bank computing devices 162 of one or more banks over the one or more networks 110. For example, the computing devices 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the computing devices 160 of a card payment network and the bank computing devices 162 when processing transactions for payment instruments that do not involve the payment service of the computing devices 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing devices 112 indicating that the user 102 has checked in with the merchant 106. In response, the computing devices 112 can communicate data to notify the merchant device 106 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing devices 112. In response, the computing devices 112 can obtain, for example, from the user account information 156, data describing a financial account associated with the electronic purchase account of the user 102 to which the total amount will be charged.

The computing devices 112 can then communicate with the computing device 160 of a card payment network to complete an electronic payment transaction for the total amount to be charged to user's electronic payment account. Once the electronic payment transaction is complete, the computing devices 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

The authorization value module 152 may operate to determine initial and incremental authorization values for open ticket transactions in the manner alluded to above. As mentioned above, in open ticket transactions, both waiting to perform authorizations till the close of the transaction and performing authorizations at each increase in the cost of the transaction have drawbacks. The authorization value module 152 determines authorization values at which to authorize payment instruments for the cost of the open ticket transaction. For example, when an open ticket is created and a payment instrument is provided to the merchant, the authorization value module may utilize information known about the payment instrument presented, a customer associated with the payment instrument, the merchant, and various other data to determine the authorization value. In a particular example, a bar merchant may create an open ticket for a user visiting the bar. The user may present the merchant with a payment instrument, for example, a credit card. The merchant may swipe the credit card through the merchant's device and information for the payment instrument may be provided to the payment service of computing devices 112. The payment module 150 may request that the authorization value module 152 determine an initial authorization value for the credit card. The authorization value module 152 may develop the logic for uses in deriving authorization values using machine learning. For example, the machine learning algorithm may develop the program logic for determining authorization values for open ticket transactions by using the aforementioned information from previous transactions and whether the payment instrument was ultimately authorized or declined as training data.

As mentioned above, in some implementations according to the disclosed techniques, the authorization value module 152 may employ a machine learning algorithm to train the logic for determining authorization values for open ticket transactions. Non-limiting examples of machine learning algorithms include artificial neural networks, support vector machines, Bayesian networks, and so on. In other implementations, the authorization value module 152 may operate to implement adaptations determined by human evaluators reviewing the outcomes of open ticket transactions including incremental authorization functionality. For example, a human evaluator may receive feedback indicating that one or more payment instruments were ultimately declined after the authorization value module 152 determined an incremental authorization value in excess of the amount for which the payment instrument was declined. The human evaluator may also be presented with various other factors, including those mentioned above. Based on the feedback, the human evaluator may adjust the weighting and/or treatment given to the factors to reduce the incremental authorization values determined for similar scenarios. This modification may be universal or limited in scope, (e.g., only affecting customers, payment instruments, and or merchants similar to those for which the issues occurred).

As mentioned above, various factors may be used to determine the authorization values. Examples of these factors and how they impact the authorization value determination are provided below.

A first broad category of factors that may be considered when determining the authorization values are related to the customer. The payment service associated with the computing devices 112 may collect information about transactions and aggregate information for the various payment instruments of customers in the database 154. Other information may be determined from public sources or from the user account information 156 stored in the database 154.

Some examples of this category relate to the interactions between the customer and merchants in the past. For example, the authorization value module 152 may consider information regarding the customer's transaction history with merchants. Such information may be utilized generally or may be filtered for information relating to interactions with the current merchant or with merchants similar to the current merchant.

General information about the customer's past transactions may include information about different transaction values for which transactions of the customer were declined or successful. For example, if a customer transaction history indicates that authorizations performed for the customer at or less than $200 have not failed or have rarely failed in the past but that authorizations performed for the customer above $200 have been declined in ten percent of such transactions, the range between the incremental authorization values determined for transactions below $200 may be greater than the range between incremental authorization values determined for transactions above $200. In some implementations, as the amount allocated to the payment instrument increases and/or as other factors indicate that the payment instrument is likely to be declined, the range between authorization values may narrow until authorizations are performed at every increase in the amount allocated to the payment instrument.

Two example factors that may be considered which may be filter or tailored for the current merchant are how often the customer visits or interacts with the current merchant and/or similar merchants and how much the customer typically spends during those interactions. For example, if a customer never or rarely interacts or visits merchants similar to the current merchant, the authorization value module 152 may set a lower initial authorization value than for a merchant with which the user regularly interacts. Such treatment may be based on the assumption that the abnormal behavior of the customer by interacting with the current merchant which is of a type the customer does not normally interact with may indicate fraud. Also, authorization failures and non-payments are less common with merchants that customers interact with regularly.

Another customer related factor that may be considered when determining authorization values is the distance of the merchant from the customer's home or normal area. In particular, a large distance may indicate that the customer is traveling or that the use of the payment instrument is fraudulent, particularly if the payment instrument is a credit card and the payment instrument information was entered manually. As such, the authorization value module 152 may set a lower initial authorization value with the goal of determining if the payment instrument is lost, stolen or being used fraudulently. However, as the customer is traveling, the range between subsequent authorization values may be greater as customers tend to spend larger amounts while traveling. Other information may be used to determine if the customer is traveling. For example, the payment service may determine that the user purchased air travel tickets and booked a hotel for the city in which the transaction for which the authorization value be being determined is occurring. Based on such data, the payment service may or may not set the lower initial authorization value.

Another customer related factor that may be considered is the customer's stated intent. For example, when the customer begins the open ticket transaction with the merchant, the customer may indicate that the merchant should alert the customer when the cost of the transaction reaches a particular amount. More particularly, a customer may tell a bartender to inform the customer when the total of the open ticket transaction reaches $100. The determination of the authorization values may take this statement into account such that the range between authorization values below $100 is greater than where the user does not provide such a statement. This may be based on the assumption that the customer is likely aware of whether or not the payment instrument can cover the amount stated.

Still another customer related factor that may be considered relates to the time and date. Some customer related times and dates that may be known to the payment service and considered when deriving authorization values include the customer's time of day transaction habits, an estimated or known pay date of the customer and information about recurring payment dates of the customer. For example, if a customer rarely participates in transactions at restaurants or bars later than 10 PM, the authorization value module 152 may set a lower initial authorization value with the goal of determining if the payment instrument is lost, stolen or being used fraudulently. On the other hand, if the current date is shortly before the customer's estimated or known pay date, there is a higher risk that the customer will have insufficient funds to cover the cost the open ticket transaction. As such, the range between authorization values may be less than on a date that is shortly after the estimated or known pay date. Similar treatment may be given on a date after a large recurring payment of the customer. For example, for transaction occurring on the days after the customer is known to have a large recurring payment and before the customer's next pay date, the range between authorization values may be reduced.

Another category of factors that may be considered when determining the authorization values is the type of the payment instrument. Some example information about the type of the payment instrument relate to whether the payment instrument is a type that indicates the customer associated with the payment instrument has good credit or that the payment instrument is less likely to be declined. For example, if the payment instrument is a VIP or exclusive type of credit card, the authorization values may be higher than if the payment instrument is a free or typical credit card. In addition, probable credit limits may be estimated from the type of credit card presented. Authorization values set for credit cards that are likely to have high credit limits may be greater than for credit cards that are likely to have low credit limits.

Another category of factors that may be considered when determining authorization values relate to information about or provided by the merchant. One example type of merchant related factor is based on the typical costs associated transactions of the merchant. For example, if the merchant is a restaurant whose cheapest beverage is $10 or more, setting authorization values at ranges which are less than $20 defeats the purpose of the incremental authorization value functionality (excluding exceptional circumstances). In other words, setting authorization values at such a range would cause an authorization to be performed every time an item is added to the open ticket. Other the other hand, if the merchant is a restaurant in which the most expensive beverage is $3, setting authorization values at ranges of $20 or less may be reasonable. A similar factor related to the merchant may be derived from the merchant's location. For example, if the merchant is located in an affluent area, the authorization values may be higher than for other restaurants. Another factor may be based on information provided by the merchant. For example, the merchant may be provided with the option to enter the merchant's impression of the customer. More particularly, in some examples, the merchant may be able to enter an indication that the customer appears more trustworthy than the average customer. Based on such an indication, the authorization value module 152 may set higher authorization values.

As would be understood by one of ordinary skill in the art, the above discussed factors for determining authorization values by the authorization value module 152 are merely examples and implementations are not so limited. Many other factors would be apparent to one of ordinary skill in the art in view of this disclosure.

As mentioned above, the operations of modules 122-124, 136-138 and 146-152 may vary depending on functionality provided by the particular implementation. As such, the implementations are not limited to the example provided above. Additional details and example functionalities of the user device(s) 104, merchant device(s) 108 and the computing devices 112 as a whole are discussed below with regard to FIGS. 2-4.

Figure 2:
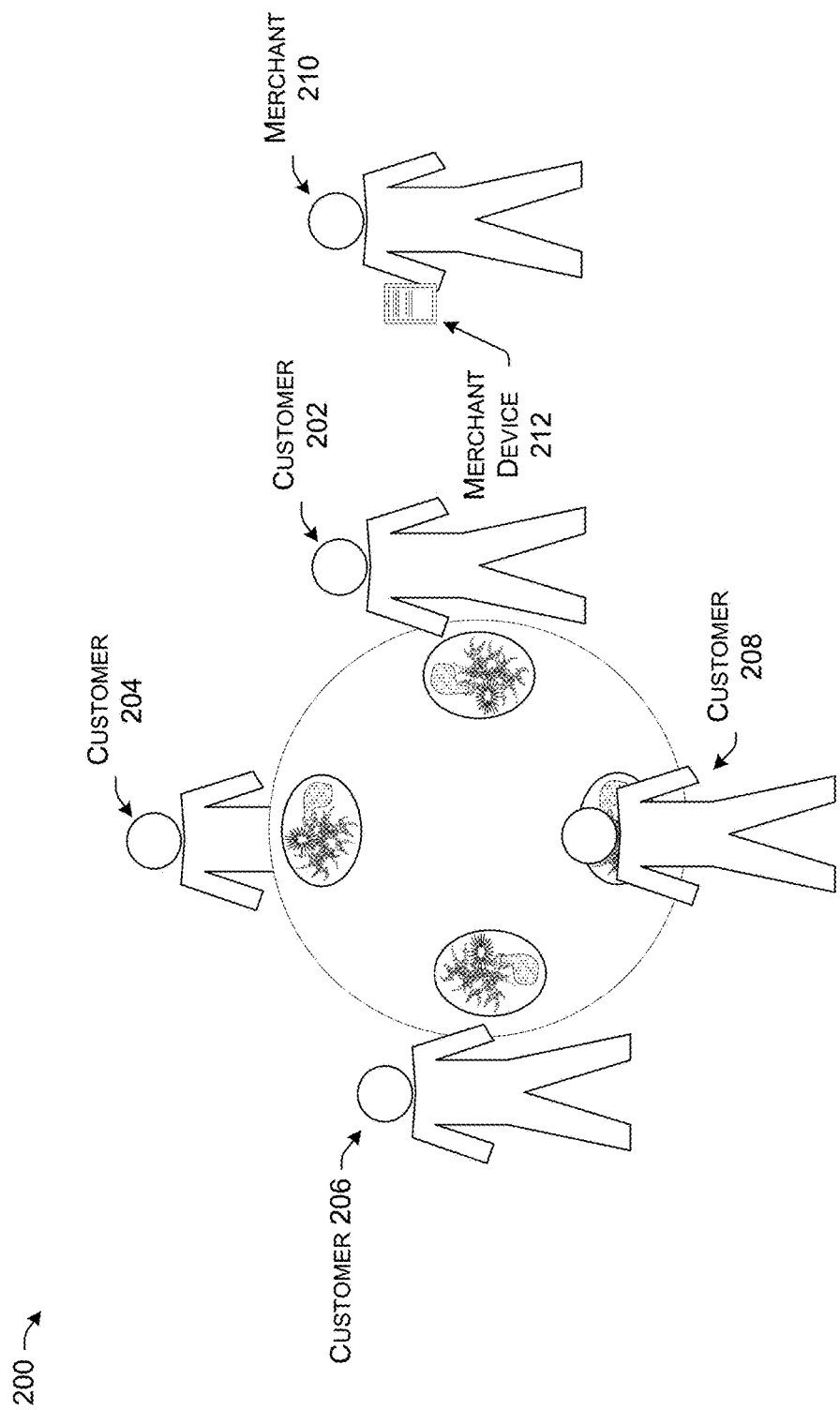
FIG. 2 is an example illustration of a scenario that provides context for FIGS. 3A-4D.
Figure 3B:
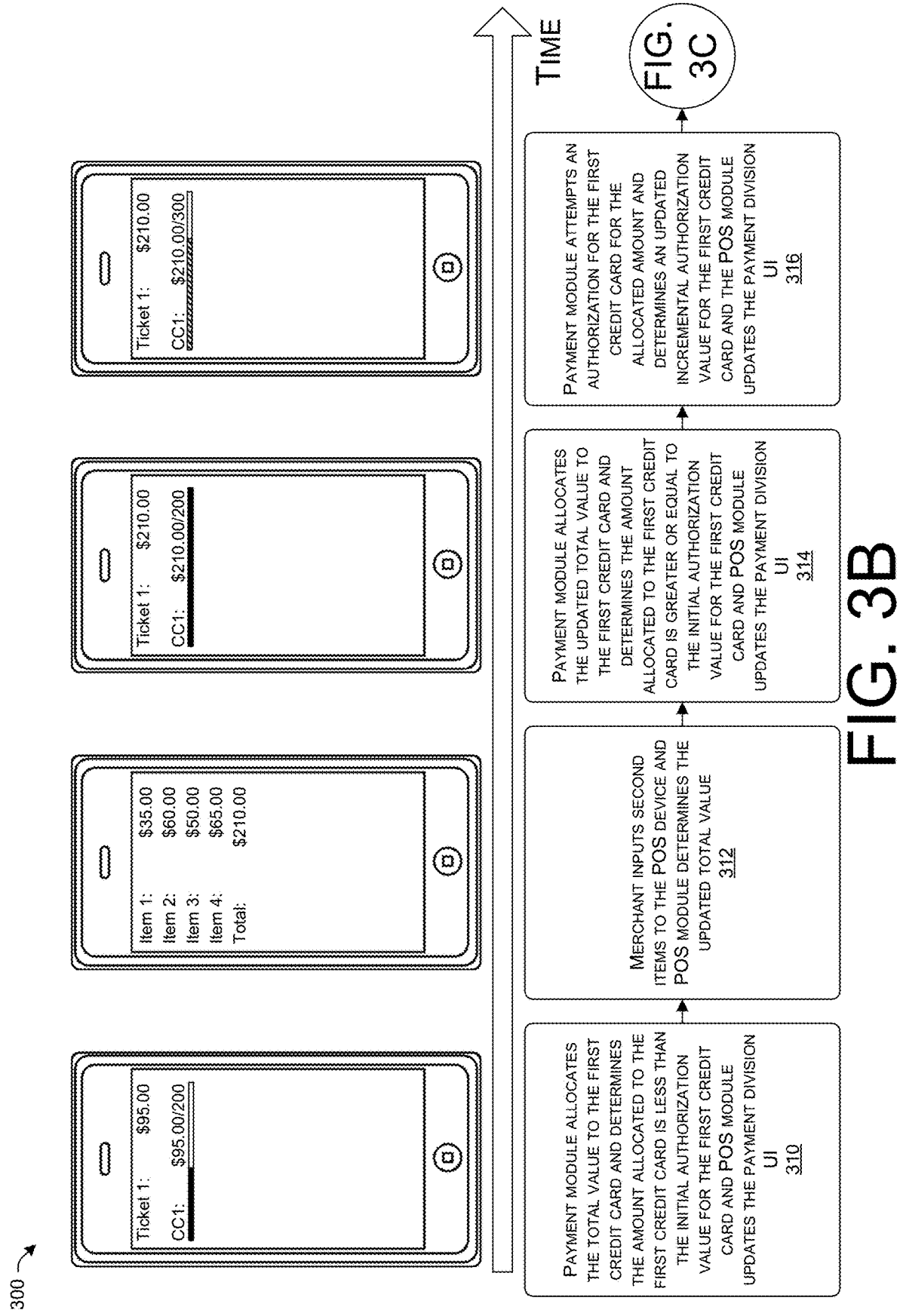
Figure 3C:
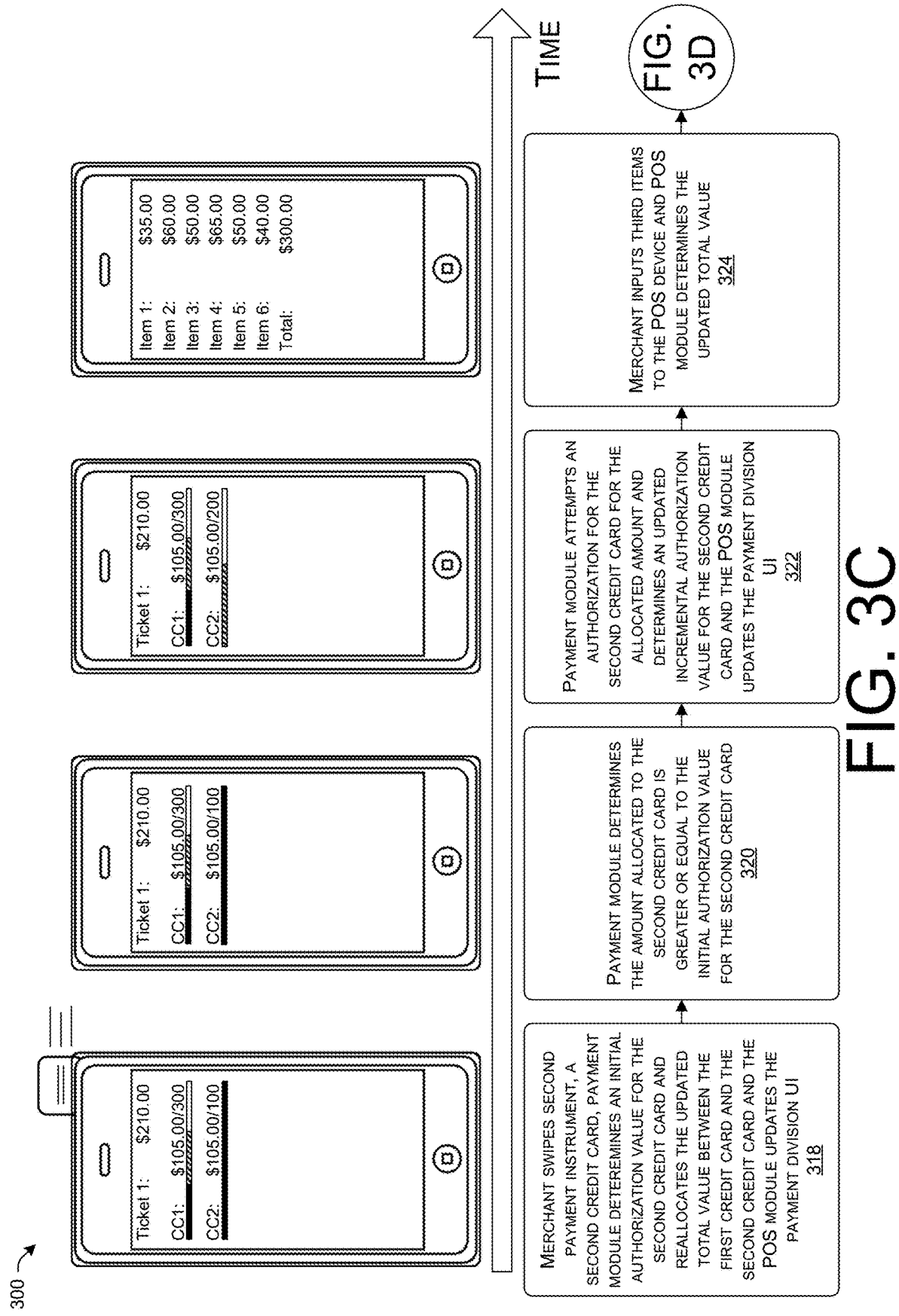
Figure 3E:
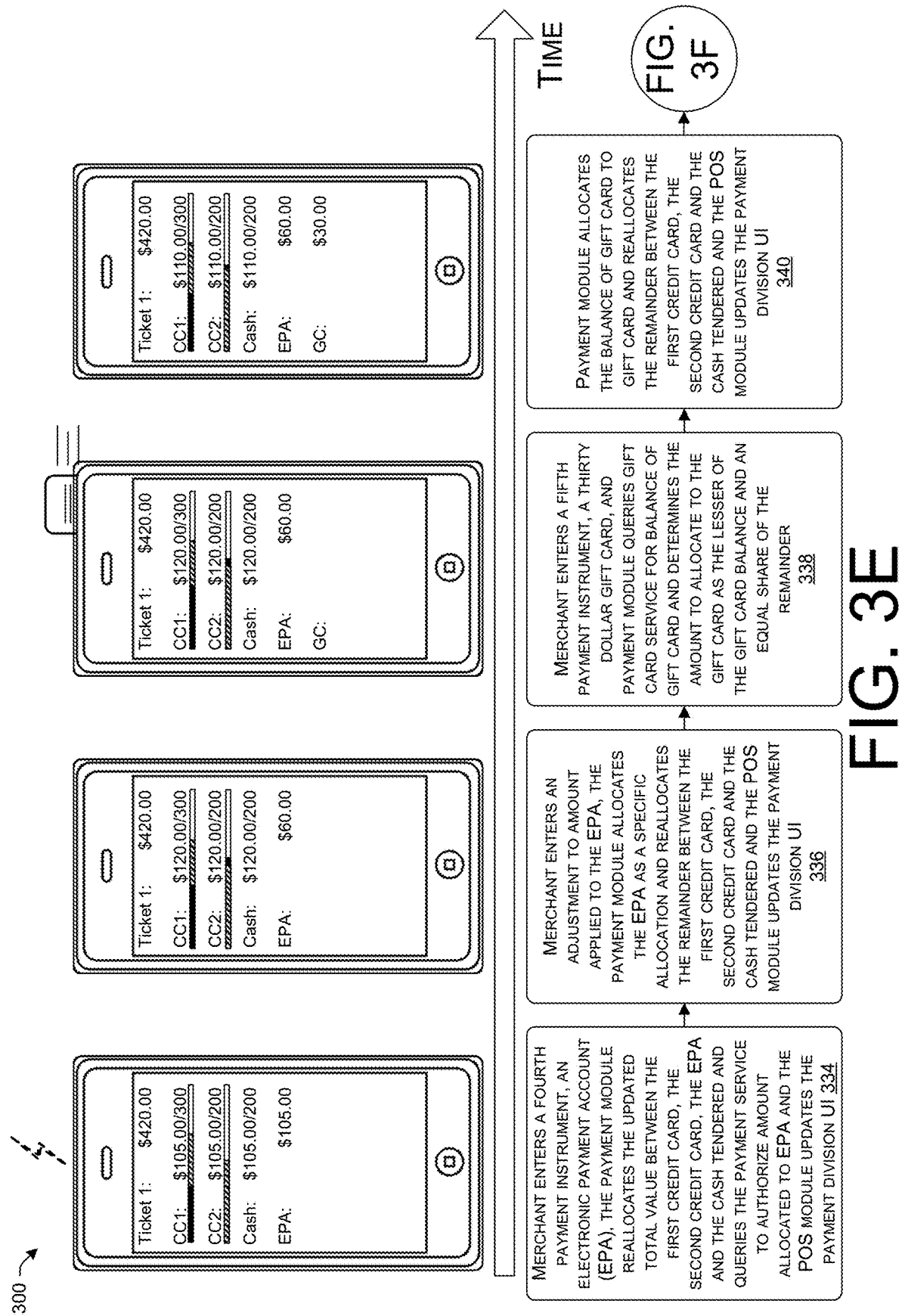
Figure 3F:
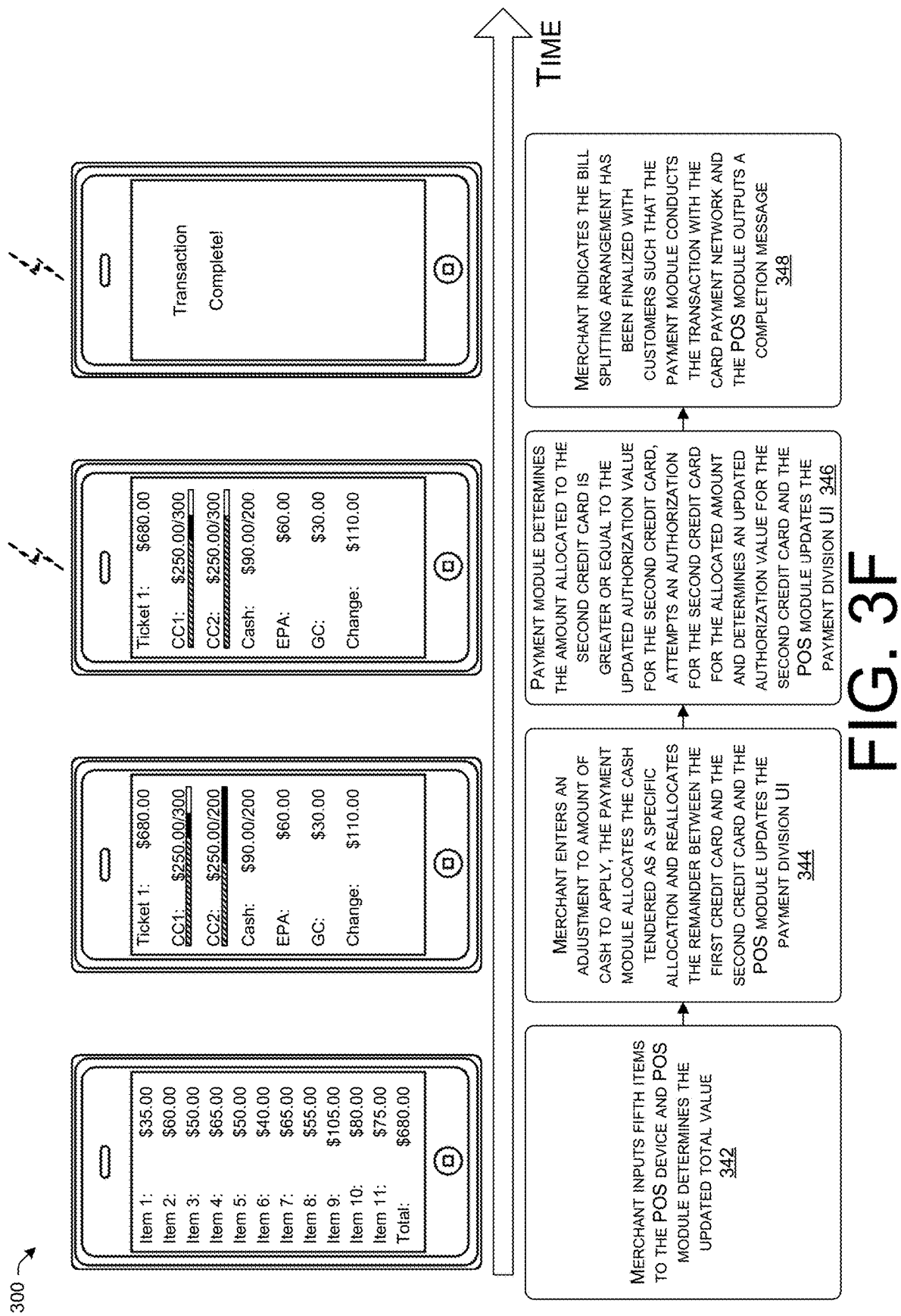

FIG. 2 is an example illustration that provides context for the discussion of various scenarios with respect to FIGS. 3A-4D. In particular, FIG. 2 is an illustration of a scenario occurring at a restaurant 200 in which open ticket transactions including incremental authorization and bill splitting operations may be performed. In general, the scenario is as follows.

Customers 202-208 are at the restaurant 200. A merchant 210 (e.g. a member of the service personnel of the restaurant) is serving the customers 202-208 at the restaurant 200. The merchant 210 creates an open ticket for items requested by the customers 202-208 using a merchant device 212. Subsequent to creating the open ticket, the merchant 210 receives one or more of payment instruments from the customers 202-208 which may include various combinations of payment cards, cash, electronic payment information for use with the payment service of the computing device(s) 112, and so on. The merchant device 212 is provided with these payment instruments, for example, by the merchant 210 swiping the payment cards, inputting the information regarding cash payments, communication with one or more user device(s) 104 of the customers 202-208 (e.g. via NFC) and so on. Also, after creating the ticket, the merchant 210 may takes customer orders and input the items into the merchant device (e.g. before, at the same time, or after inputting one or more payment instruments to the merchant device). Open ticket transactions including incremental authorization and bill splitting operations are performed by the payment service and/or merchant device 212 between the various payment instruments in the manner described below with regard to FIGS. 3A-4D. While or after providing the payment instruments and/or items to the merchant device 212, the merchant 210 may provide adjustment information to the merchant device 212 to change the bill splitting between the payment instruments. Additional items, payment instruments or adjustments may be received from the merchant throughout the life of the open ticket. As items are added, payment instruments are received, and/or adjustments are input, the amount allocated to the one or more payments instruments may change. As the amounts allocated change, the payment service and/or merchant device 212 may determine incremental authorization values at which to perform authorizations on one or more of the payment instruments. At the end of the open transaction, the merchant may indicate to the merchant device 212 that the open ticket is to be closed and the merchant device 212 may then execute the transactions for the payment instruments based on the bill splitting arrangement.

In view of this general description of the scenario illustrated in FIG. 2, various techniques for performing the associated tasks for bill splitting will be discussed with regard to FIGS. 3A-4D.

The example processes are described in the context of the environment of FIG. 1 but are not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media or embodied as one or more computer transmission media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In some implementations, the computer transmission media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIGS. 3A-3F collectively illustrate a sequence diagram 300 illustrating an example open ticket transaction including incremental authorization and bill splitting operations executed by a payment service and a merchant device in a point-of-sale (POS) context. The process of FIGS. 3A-3F is discussed in the context of the scenario of FIG. 2 described above. However, this is merely to aid in comprehension and the process may be utilized in many other contexts.

At 302, the merchant inputs a request to create an open ticket for the customers. For example, the merchant may tap the "open ticket" button displayed by the UI to instruct the merchant device and the payment service to create an open ticket. Subsequent to receiving the instruction, the payment module of the computing devices may create a data record (e.g. stored in the database) to maintain information regarding the open ticket.

At 304, the POS module of the merchant device presents a UI requesting the merchant enter a payment instrument for the open ticket. The merchant swipes the first payment instrument, a first credit card, to provide payment instrument information for the first credit card. In the illustrated example, upon creating the open ticket, payment information is requested by the payment module via the POS module prior to the merchant entering items requested by the customers. However, implementations are not so limited. In some implementations, the merchant may enter items requested by the customers and request payment information from the customers at the merchant's discretion or in some other point in the transaction.

At 306, after the payment instrument information for the first credit card is received, the payment module may determine an initial authorization value for the first credit card. In the illustrated example, the initial authorization value for the first credit card is determined to be $200. The determination of the authorization value may be based on one or more factors such as prior interactions with the customer, information about the payment instrument, and so on. Additional details regarding the determination of the authorization value and example factors upon which it may be based were provided above with respect to FIG. 1. Once the authorization value is determined, the POS module displays a payment division user interface (UI). In the illustrated example of FIGS. 3A-3F, the payment division UI includes a listing of payment instruments. Depending on the type of payment instrument, different information may be conveyed. As the first credit card (CC1) has not been given a specific allocation and is not of a capped instrument type (e.g. an instrument with a known maximum value such as a gift card or an amount of cash), the payment division UI displays the amount allocated to the instrument, the current authorization value and a bar chart visually relating, as a portion of the current authorization value, the amount allocated and/or the amount authorized for the payment instrument. However, as no items have yet been input to the POS device, no amount is yet allocated to the first credit card. Additional details of the bar chart visualization and the payment division UI will be provided below.

At 308, the merchant inputs one or more first item(s) requested by the customers from the merchant into the POS device. The POS module determines the cost of the first items to determine a total value. In the illustrated example, the merchant inputs two items, item 1 with the cost of $35 and item 2 with the cost of $60, for a total of $95. At this point in the process, no specific allocation of the total due has been made so the total due may be considered as a non-specific remainder of the total due. As specific allocations of the cost of the transaction are allocated to particular payment instruments, the non-specific remainder is reduced and, in some implementations, is the difference of the total due and the amount specifically allocated by the payment module to various "specific allocation" instruments. In the illustrated example, the non-specific remainder is divided equally between the non-specific payment instruments (e.g., payment instruments for which a specific allocation of the cost has not been specified by the payment module or the merchant). The process then continues to FIG. 3B.

At 310, the payment module allocates the total value (i.e. the non-specific remainder) to the first credit card and determines that the amount allocated to the first credit card is less than the initial authorization value for the first credit card (i.e. $95 is less than $200). As such, the payment module does not perform an authorization for the first credit card at this point in the process. The POS module then update the payment division UI based on the allocation by the payment module. In particular, the payment division UI is updated to show that $95 allocated to the first credit card and the bar chart visualization is modified to include an indicator showing that 47.5% of the initial authorization value determined for the first credit card has been allocated to the first credit card, none of which is covered by a prior authorization (visualized by filling of 47.5% of the bar chart visualization with black).

At 312, the merchant inputs one or more second items to the POS device and the POS module determines an updated total value. In the illustrated example, the merchant inputs two additional items, item 3 with the cost of $50 and item 4 with the cost of $65, for an updated total value of $210. At this point the process, the updated total value is also the non-specific remainder because no specific allocations have yet been made.

At 314, the payment module allocates the updated total value to the first credit card and determines that the amount allocated to the first credit card is now greater than or equal to the initial authorization value for the first credit card (i.e. $210 is greater than $200). The POS module updates the payment division UI based on the allocation by the payment module. In particular, the payment division UI is updated to show that $210 allocated to the first credit card and the bar chart visualization is modified to include an indicator showing that 100% of the initial authorization value determined for the first credit card has been allocated to the first credit card, none of which is covered by a prior authorization (visualized by filling of 100% of the bar chart visualization with black). While the bar chart visualization of the illustrated example does not show the authorization value of the payment instrument has been exceeded, implementations are not so limited and some implementations may include such a visual indication.

At 316, because the payment module determined that the amount allocated to the first credit card is now greater than or equal to the initial authorization value for the first credit card, the payment module attempts an authorization for the first credit card. In particular, the payment module attempts to authorize the first credit card for the amount allocated (i.e. $210). After authorizing the first credit card for the amount allocated, the payment module determines an updated incremental authorization value for the first credit card. The determination of the updated incremental authorization value may be based on the same and/or different factors as the initial authorization value. In the illustrated example the updated incremental authorization value for the first credit card is $300. Once the updated incremental authorization value for the first credit card is determined, the POS module updates the payment division UI. In particular, the authorization value shown for the first credit card is updated to $300 and the bar chart visualization is updated to show that 70% of the current authorization value has been authorized and allocated to the first credit card (visualized by filling of 70% of the bar chart visualization with diagonal hatching). The process then continues to FIG. 3C.

At 318, the merchant 210 swipes a second payment instrument, a second credit card. The payment module determines an initial authorization value for the second credit card. In the illustrated example, the initial authorization value for the second credit card is $100. The payment module then reallocates the non-specific remainder (i.e. $210.00) between the first credit card and the second credit card equally. Once the updated incremental authorization value for the second credit card is determined and the non-specific remainder has been reallocated, the POS module updates payment division UI. In particular, the amount shown as allocated to the first credit card is updated to $105 and the bar chart visualization for the first credit card is updated to show that 35% of the current authorization value has been allocated to the first credit card and 70% of the current authorization value has been authorized (visualized by filling of the first 35% of the bar chart visualization with black and the remaining 35% of the bar chart visualization with diagonal hatching). In addition, the payment division UI is updated to show that $105 is allocated to the second credit card and a bar chart visualization is added for the second credit card that indicates that 100% of the initial authorization value determined for the second credit card has been allocated to the second credit card, none of which is covered by a prior authorization.

At 320, the payment module determines the amount allocated second credit card is greater or equal to the initial authorization value for the second credit card (i.e. $105 is greater than $100). At 322, because the payment module determined that the amount allocated to the second credit card is now greater than or equal to the initial authorization value for the second credit card, the payment module attempts an authorization for the second credit card. In particular, the payment module attempts to authorize the second credit card for the amount allocated (i.e. $105). After authorizing the second credit card for the amount allocated, the payment module determines an updated incremental authorization value for the second credit card. In the illustrated example the updated incremental authorization value for the second credit card is $200. Once the updated incremental authorization value for the second credit card is determined, the POS module updates the payment division UI. In particular, the authorization value shown for the second credit card is updated to $200 and the bar chart visualization is updated to show that 52.5% of the current authorization value has been authorized and allocated to the second credit card (visualized by filling of 52.5% of the bar chart visualization with diagonal hatching).

At 324, the merchant inputs one or more third items to the POS device and the POS module determines an updated total value. In the illustrated example, the merchant inputs two additional items, item 5 with the cost of $50 and item 6 with the cost of $40, for an updated total value of $300. The process then continues to FIG. 3D.

At 326, the payment module reallocates the updated total value between the first credit card and the second credit card (i.e. $150 to each) and determines that the amount allocated to the first credit card and second credit care are less than the current authorization values for the payment instruments. The POS module updates the payment division UI based on the allocations by the payment module. In particular, the amount shown as allocated to the first credit card and the amount shown as allocated to the second credit card are updated to $150. The bar chart visualization for the first credit card is updated to show that 50% of the current authorization value has been allocated to the first credit card and 70% of the current authorization value has been authorized (visualized by filling of the first 50% of the bar chart visualization with black and the remaining 35% of the bar chart visualization with diagonal hatching). The bar chart visualization for the second credit card is updated to show that 75% of the current authorization value has been allocated to the first credit card and 52.5% of the current authorization value has been authorized (visualized by filling of the first 52.5% of the bar chart visualization with diagonal hatching and the remaining 22.5% of the bar chart visualization with black).

At 328, the merchant 210 enters a third payment instrument, two hundred dollars cash. In particular, the merchant enters the two hundred dollars cash as a non-specific allocation payment item. As cash payment instruments have a cap on the amount the instruments can cover (i.e. the face value of the cash), no authorization amount is determined for the cash payment instrument. In addition, in the illustrated example, no bar chart visualization is included for cash payment instruments and similar payment instruments. However, implementations are not so limited and some implementations may include bar chart visualizations for more or fewer types of payment instruments. The payment module then reallocates the non-specific remainder (i.e. $300.00) between the first credit card, the second credit card and the cash equally. Once the non-specific remainder has been reallocated, the POS module updates payment division UI. In particular, the amounts shown as allocated to the first credit card, the second credit card and the cash is updated to $100. In addition, the bar chart visualizations for the first credit card and the second credit card are updated in a similar manner to that described above to visualize the current state of those payment instruments.

At 330, the merchant inputs one or more fourth items to the POS device and the POS module determines an updated total value. In the illustrated example, the merchant inputs two additional items, item 7 with the cost of $65 and item 8 with the cost of $55, for an updated total value of $420.

At 332, the payment module reallocates the updated total value between the first credit card, the second credit card, and the cash (i.e. $140 to each) and determines that the amount allocated to the first credit card and second credit care are less than the current authorization values for the payment instruments and that the amount allocated to the cash has not exceeded the cap of $200. The POS module updates the payment division UI based on the allocations by the payment module. In particular, the amounts shown as allocated to the first credit card, the second credit card and the cash are updated to $140. In addition, the bar chart visualizations for the first credit card and the second credit card are updated in a similar manner to that described above to visualize the current state of those payment instruments. The process then continues to FIG. 3E.

At 334, a fourth payment instrument, an electronic payment account (EPA), is input to the merchant device. For example, the merchant may enter the information for the EPA or the merchant device may receive the information for the EPA from a customer device. The payment module may determine a type of payment source associated with the EPA in order to determine the treatment of the EPA. For example, in some scenarios, the payment source of the EPA may be a credit card account previously provided by the customer to the payment service for which the payment service does not know a spending limit and for which the payment service is charged transaction fees for authorizations. In such scenarios, the payment module may treat the EPA in a similar manner to the first and second credit cards, for example, by performing incremental authorization operations with regard to the EPA. In other scenarios, the EPA may be associated with a payment source that is either cash or which has a spending limit known and/or determined by the payment service (e.g. a credit account of the customer with the payment service). In such scenarios, the payment module may treat the EPA a similar manner to cash tendered and similar visual information may be provided in the payment division UI by the POS module. In some implementations, the payment service may not provide the spending limit information for the EPA to the merchant device (e.g. for privacy reasons). Further, because the payment service may not pay transaction fees for authorizations on such electronic payment accounts, the payment module may perform authorizations for the EPA each time the value allocated to the EPA increases, may perform no authorizations, or may perform authorizations based on another pattern. In the illustrated example, the EPA is associated with a payment source with a spending limit that is known to the payment service. As such, throughout the remainder of the process of FIGS. 3A-3F, each time the amount allocated to the EPA exceeds the previously authorized amount, the payment source may perform another authorization. Further, because no authorization value is determined for the EPA, no bar chart visualization is displayed in the payment division UI.

After receiving the fourth payment instrument information, the payment module reallocates the non-specific remainder (i.e. $420.00) between the first credit card, the second credit card, the EPA and the cash equally. As discussed above, the payment module queries the payment service to authorize the amount allocated to the EPA. Once the non-specific remainder has been reallocated and the authorization of the EPA has been performed, the POS module updates the payment division UI. In particular, the amounts shown as allocated to the first credit card, the second credit card, the EPA and the cash is updated to $105.

In addition, the bar chart visualizations for the first credit card and the second credit card are updated visualization in a similar manner to that described above to visualize the current state of those payment instruments.

At 336, the merchant enters an adjustment to the amount to be applied to the EPA (i.e. a manual specific allocation). In particular, the merchant enters that the EPA is to be allocated $60 of the cost of the open ticket transaction. As such, the payment module labels, marks or otherwise categorizes the EPA is a manual specific allocation instrument and allocates $60 to the EPA as a specific allocation. This decreases the non-specific remainder to $360. The payment module reallocates the non-specific remainder (i.e. $360.00) between the first credit card, the second credit card, and the cash equally. Once the non-specific remainder has been reallocated, the POS module updates the payment division UI. In particular, the amounts shown as allocated to the first credit card, the second credit card and the cash is updated to $120 and the amount allocated to the EPA is $60. In addition, the bar chart visualizations for the first credit card and the second credit card are updated in a similar manner to that described above to visualize the current state of those payment instruments.

At 338, the merchant swipes a fifth payment instrument, a thirty dollar gift card. Because, in the implementation illustrated, gift cards are considered capped payment instruments, the payment module queries a gift card service associated with the gift card for the balance of the gift card. For example, the payment module may query the card payment network computing device(s) 160 to obtain the balance of the gift card. Once the payment module receives the gift card balance from the gift card service associated with the gift card, the payment module determines the amount to allocate to the gift card as the lesser of the gift card balance (i.e. an automated specific allocation) and an equal share of the non-specific remainder (i.e. a non-specific allocation). As mentioned above, in the illustrated example, the gift card has a balance of thirty dollars and an equal one-fourth share of the non-specific remainder of $360 is $90. As such, the balance of the gift card is determined to be the lesser amount.

At 340, the payment module allocates the gift card balance to the gift card as an automated specific allocation and reallocates the non-specific remainder (i.e. $330.00) between the first credit card, the second credit card and the cash tendered. Once the non-specific remainder has been reallocated, the POS module updates the payment division UI. In particular, the amounts shown as allocated to the first credit card, the second credit card and the cash is updated to $110 and the amount allocated to the gift card is shown as $30. In addition, the bar chart visualizations for the first credit card and the second credit card are updated in a similar manner to that described above to visualize the current state of those payment instruments. The process then continues to FIG. 3F.

At 342, the merchant inputs one or more fifth items to the POS device and the POS module determines an updated total value. In the illustrated example, the merchant inputs three additional items, item 9 with the cost of $105, item 10 with a cost of $80 and item 11 with the cost of $75, for an updated total value of $680. Subsequently, the payment module reallocates the non-specific remainder (i.e. $590) between the first credit card, the second credit card and the cash and the payment division UI is updated accordingly in the manner discussed above (not shown).

At 344, the merchant enters an adjustment to the amount to be applied to the cash (i.e. a manual specific allocation). In particular, the merchant enters that the cash is to be allocated $90 of the cost of the open ticket transaction. As such, the payment module labels, marks or otherwise categorizes the cash is a specific allocation instrument and allocates $90 to the cash as a manual specific allocation. This decreases the non-specific remainder to $500. In addition, the payment module determines that, if the open ticket transaction were executed as currently allocated, $110 in change should be returned to the customers. The payment module reallocates the non-specific remainder (i.e. $500.00) between the remaining non-specific payment instruments equally (i.e. the first credit card and the second credit card). Once the non-specific remainder has been reallocated, the POS module updates the payment division UI. In particular, the amounts shown as allocated to the first credit card and the second credit card is updated to $250 and the amount allocated to the cash is updated to $90 of the $200 tendered. The payment division UI is further updated to include the indication that $110 change is to be returned if the open ticket transaction were executed as currently allocated. In addition, the bar chart visualizations for the first credit card and the second credit card are updated in a similar manner to that described above to visualize the current state of those payment instruments.

At 346, the payment module determines the amount allocated second credit card is greater or equal to the updated incremental authorization value for the second credit card (i.e. $250 is greater than $200). Because the payment module determined that the amount allocated to the second credit card is now greater than or equal to the current authorization value for the second credit card, the payment module attempts an authorization for the second credit card. In particular, the payment module attempts to authorize the second credit card for the amount allocated (i.e. $250). After authorizing the second credit card for the amount allocated, the payment module determines an updated incremental authorization value for the second credit card. In the illustrated example the updated incremental authorization value for the second credit card is $300. Once the updated incremental authorization value for the second credit card is determined, the POS module updates the payment division UI. In particular, the authorization value shown for the second credit card is updated to $300 and the bar chart visualization for the second credit card is updated accordingly.

At 348, the merchant indicates the bill splitting arrangement has been finalized with the customers and the payment module conducts the transaction with the card payment network and the POS module outputs a completion message to the display of the merchant device.

The sequence of operations described above is only an example provided for discussion purposes. For example, the implementation discussed above divided payment instruments into capped and non-capped instruments. In particular, instruments classified as uncapped (e.g. credit cards) were assumed to have no cap on the amount that can be charged thereto while instruments classified as capped were assumed to have a cap on the amount that can be charged thereto. As such, the cap is determined for capped instruments to determine the amount to be allocated thereto. In other implementations, different classification schemes or classifications for different types of instruments may be made or all payment instruments may be treated as capped or uncapped instruments.

Further, in the implementation discussed above, the authorization values are treated individually and the bill splitting is performed without reference to the authorization values, for example, in the splitting of the non-specific remainder of $500 and subsequent authorization of the second credit card at 344-346). In other implementations, the authorization values may be pooled. Returning to the example of 344-346, if the sum of the authorization values for the first credit card and second credit card were $501, the payment module may abstain from performing an authorization and determination of new authorization values until the non-specific remainder reaches $501. In another variation, the authorization values may be pooled with other payment instruments presented, such as the $200 cash such that new authorization values are not determined until the non-specific remainder reaches $700. Other variations on such a pooling of the authorization values would be apparent to one of ordinary skill in the art in view of this disclosure. In addition, the bill splitting operations may follow the pooling of the authorization values or may be independent except when a payment instrument is declined or another issue arises.

Numerous other variations are possible. Additional example variations are provided below following the discussion of FIGS. 4A-4D.

FIG. 4 is a flow diagram illustrating an example process 400 for handling open ticket transactions including incremental authorization and bill splitting operations as disclosed herein. The following actions described with respect to FIG. 4A-4D may be performed by the merchant device(s) 108 and/or computing devices 112 as shown in FIG. 1 and may be used in the context of FIGS. 2-3F.

At 402, the payment module receives a request to create an open ticket for the customers and processes the request to create the open ticket. For example, the payment module may create a data record for the open ticket transaction in the database.

At 404, the payment module provides the POS module of the merchant device with the current state of the open ticket and the POS module updates the UI of the merchant device. The user interface may vary from implementation to implementation and may be similar to that shown in FIGS. 3A-3F. For example, once a payment instrument and/or items have been added to the open ticket transaction, the POS module may update the UI to display a payment division UI similar to that shown in FIGS. 3A-3F.

At 406, the payment module receives an input from the merchant to perform a change to the open ticket transaction. At 408, the type of input is determined. In the example process 400, the payment module determines if the input is the addition of a payment instrument, an addition of one or more items to the open ticket, an allocation adjustment of any bill splitting arrangement or an indication that the open ticket transaction is complete and should be executed. If the input is the addition of a payment instrument, the process proceeds to 410 on FIG. 4B. If the input is the addition of one or more items to the open ticket, the process proceeds to 412 on FIG. 4C. If the input is an allocation adjustment of any bill splitting arrangement, the process proceeds to 414 on FIG. 4D. If the input is an indication that the open ticket transaction is complete, the process proceeds to 416.

Figure 4A:
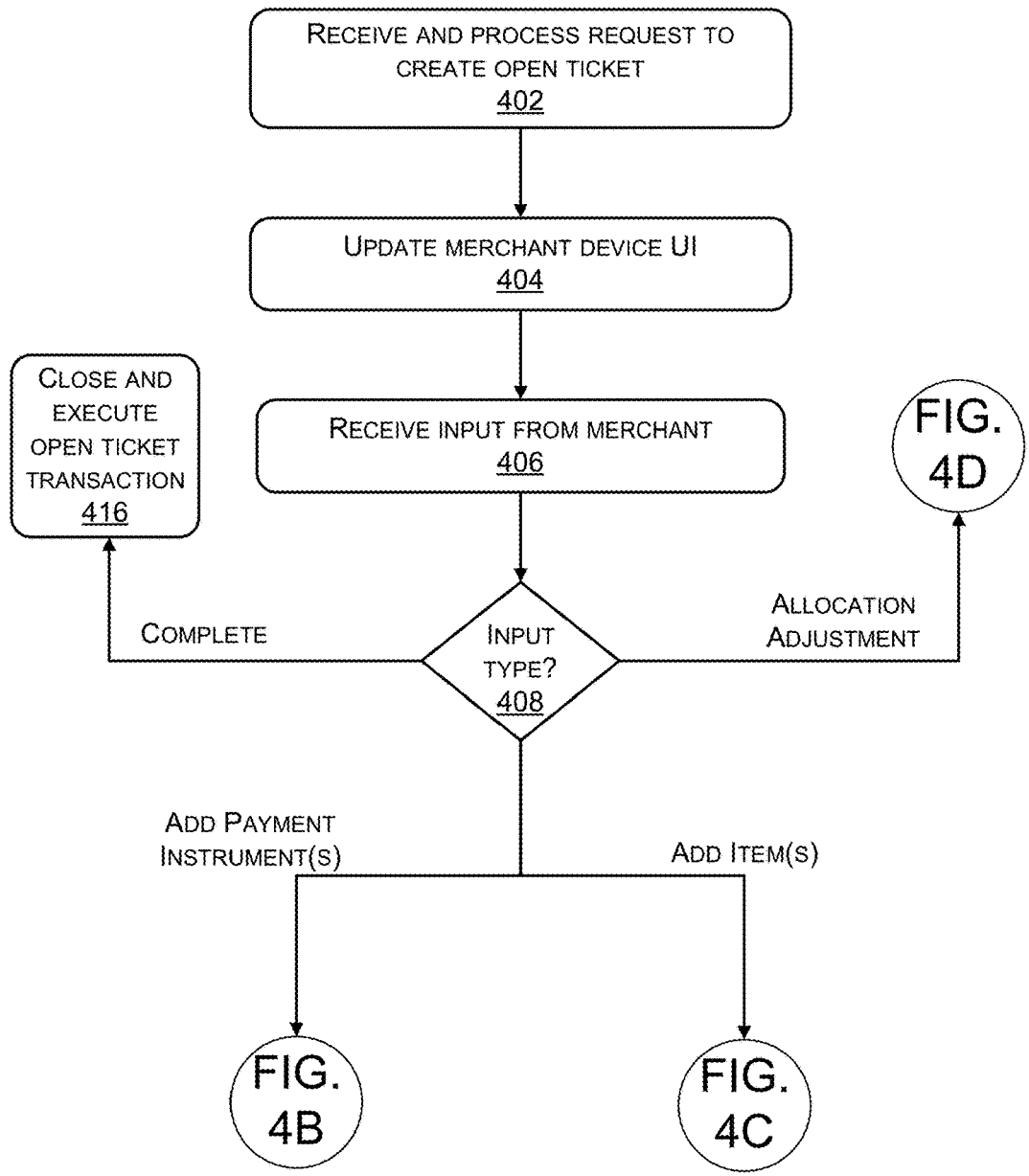
FIGS. 4A-4D are flow diagrams illustrating an example process for handling open ticket transactions including incremental authorization operations and bill splitting operations in the system shown in FIG. 1 and as discuss with regard to FIGS. 2-3B.
Figure 4B:
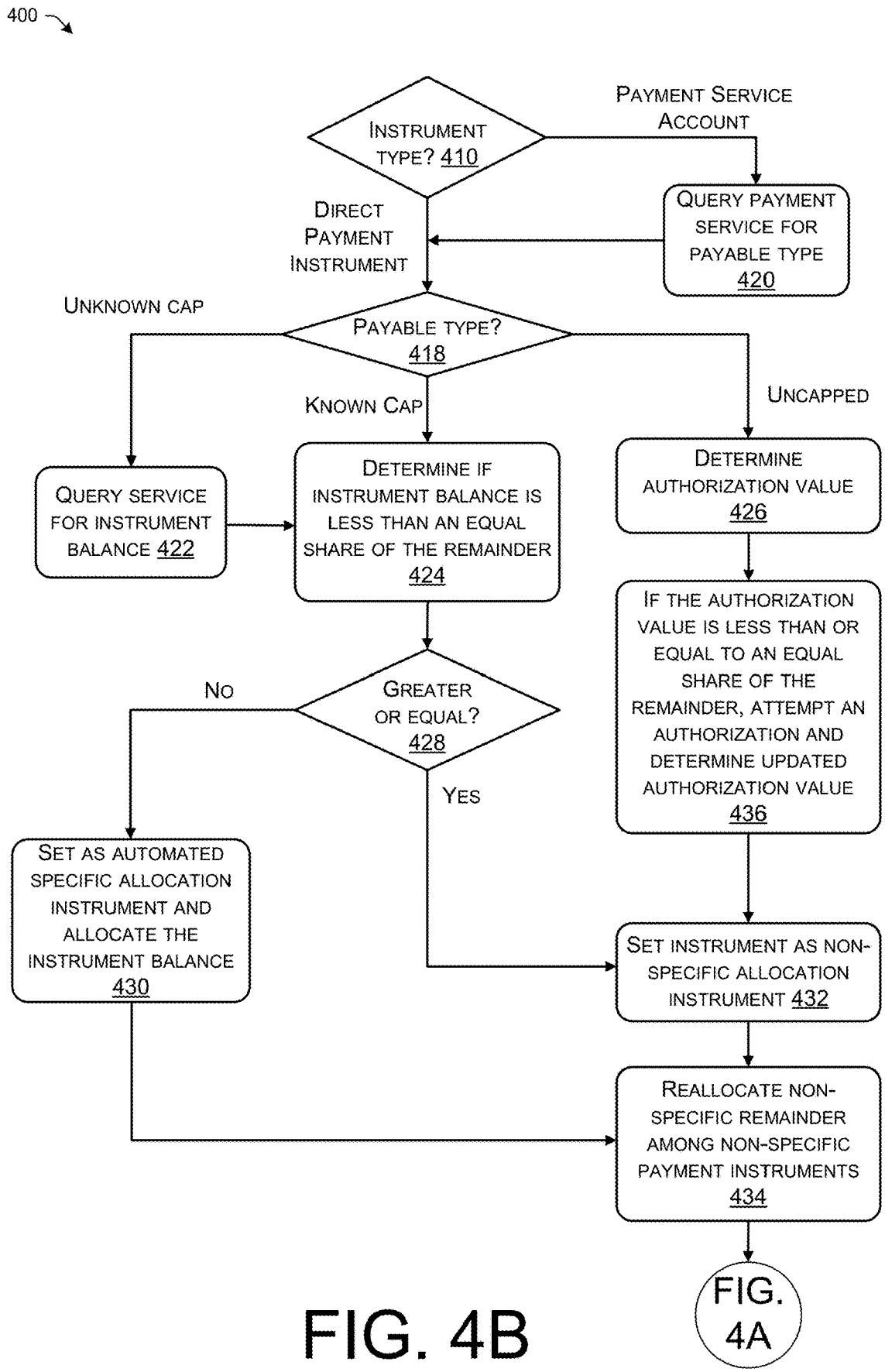
Figure 4C:
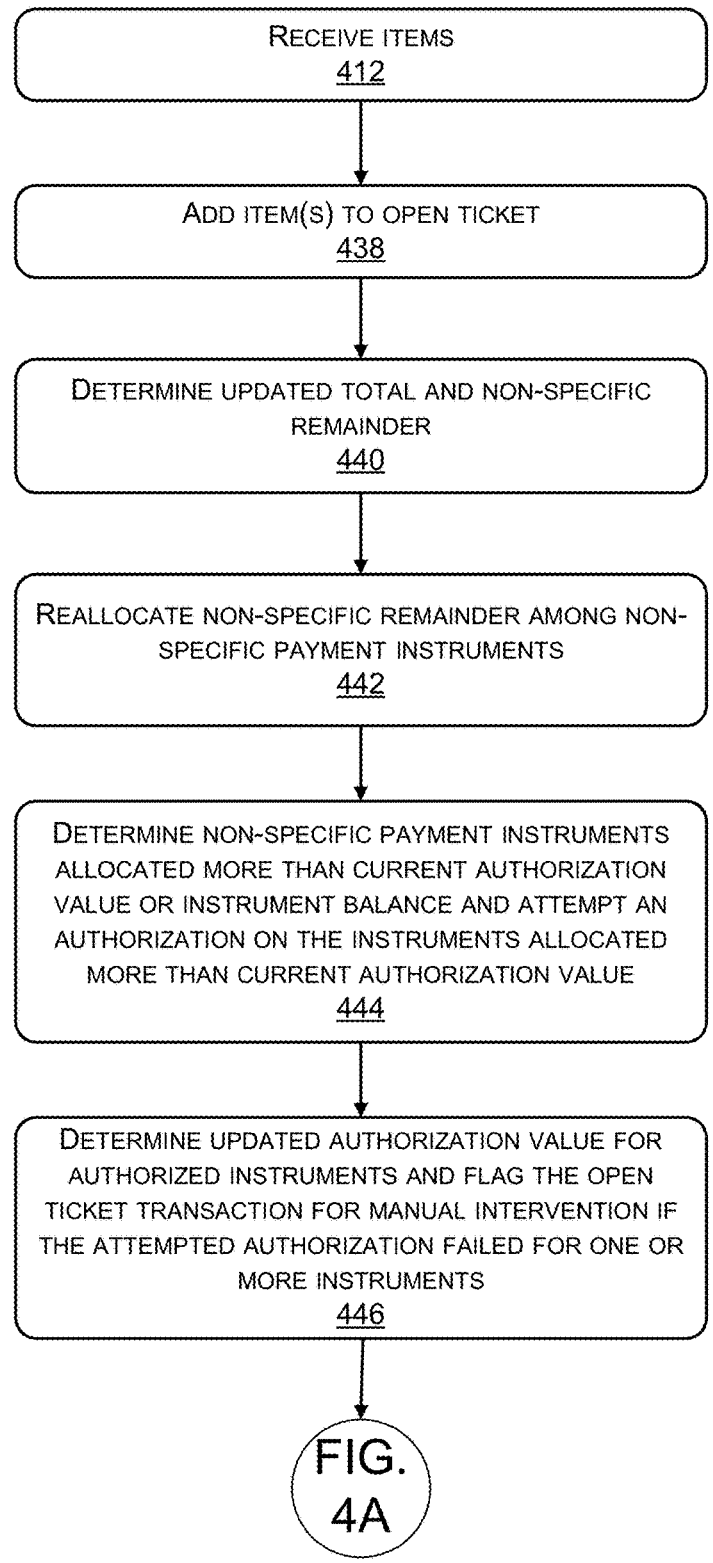
Figure 4D:
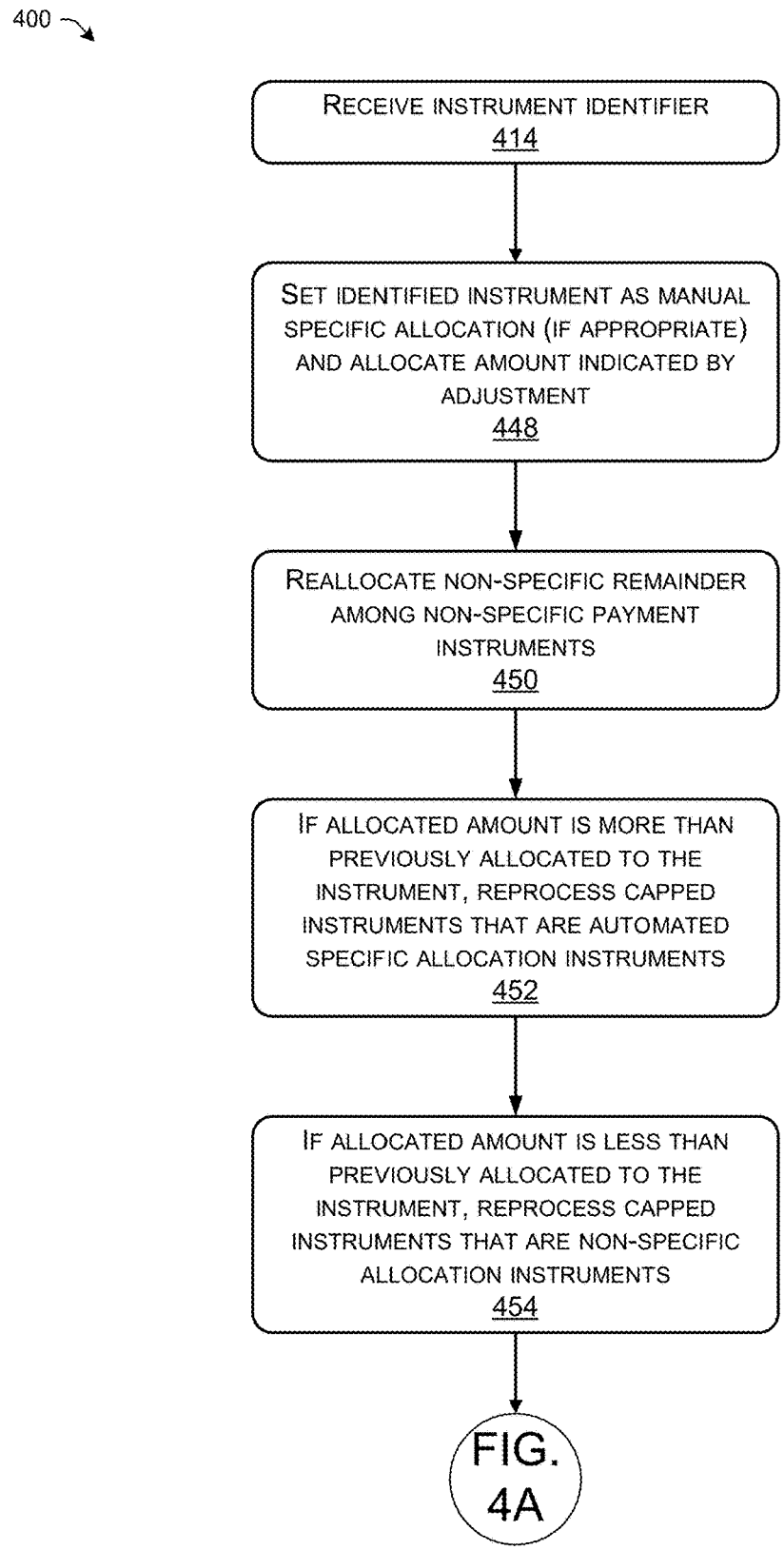

Turning to FIG. 4B, at 410, a determination is made of the general type of the payment instrument to be added. In the example process 400, the payment module determines if the payment instrument is a direct payment instrument (e.g., cash, payment card, check, etc.) or an electronic payment account through a payment service. If the payment instrument is a direct payment instrument, the process proceeds to 418. If the payment instrument is an electronic payment account through a payment service, the process proceeds to 420.

At 418, the payable type of the payment instrument is determined. In the illustrated example process 400, the payment module determines if the payment instrument is classified as a capped instrument with an cap that is not known to the payment module (e.g. a gift card), a capped instrument with a known cap (e.g. the face value of cash tendered) or an uncapped instrument (e.g. a credit card). If the payment instrument is classified as a unknown capped payable type of instrument, the process proceeds to 422. If the payment instrument is classified as a known capped payable type of instrument, the process proceeds to 424. If the payment instrument is classified as an uncapped payable type of instrument, the process proceeds to 426.

At 422, the payment module queries a service for the instrument balance of the payment instrument to be added. For example, for a gift card, a gift card service may be queried for the balance of the gift card. In the example illustrated in FIG. 4A-4D, the instrument balance may be the maximum amount that can be charged to the payment instrument. For example, in implementations in which other instruments, such as debit cards, are treated as capped instruments, the appropriate service may be queried for account balance of the account associated with the debit card. The process may then continue to 424.

At 424, the payment module may determine if the instrument balance is less than an equal share of the unallocated non-cash total. At 428, the payment module determines how to treat the payment instrument based on the determination at 424. If the instrument balance is less than an equal share of the non-specific remainder (i.e. the amount to be split among non-specific payment instruments), the process continues to 430. Otherwise, the process continues to 432.

At 430, the payment instrument is set as an automated specific allocation instrument and allocated its instrument balance as a specific allocation. In turn, the non-specific remainder is reduced by the instrument balance. Returning to 432 (which may be reached when the instrument balance is greater or equal to an equal share of the non-specific remainder), the payment instrument is set as a non-specific allocation instrument. Following either 430 or 432, the process continues to 434.

At 434, the payment module reallocates the non-specific remainder among the non-specific payment instruments. Subsequent to 434, the process returns to 404 of FIG. 4A.

Returning to 426 (which may be reached when the instrument type is determined to be an uncapped payment instrument), the payment module may determine an authorization value for the uncapped payment instrument. The determination of the authorization value may be performed based on various factors in the manner discussed above with regard to FIG. 1. The process then continues to 436.

At 436, if the authorization value determined at 426 is less than or equal to an equal share of the remainder, the payment module may attempt an authorization for the payment instrument. Subsequent to performing a successful authorization of the payment instrument, the payment module may determine an updated authorization value for the payment instrument. If the authorization is unsuccessful, the payment module may flag the open transaction and prompt the merchant for manual intervention. The process then continues to 432 and proceeds as discussed above.

In some implementations, the determinations of the equal share of the remainder in 424 and 428 may determine if other capped payment instruments previously set as automated specific allocation instruments (e.g. because the instrument balance was less than an equal share at the previous time) may be set as non-specific allocation instruments due the reduction in the amount of an equal share resulting from the addition of another payment instrument. For example, in a scenario in which two credit cards and a $40 gift card are presented to pay a bill for $140, the gift card cannot cover an even share (one third of $140). Instead, the bill splitting operations allocate $40 to the gift card and the two credit cards would split be remaining $100. If another credit card is swiped, the gift card should be set as a non-specific allocation instrument because one-fourth of $140 is less than $40. Automated specific allocation payment instruments determined to be movable (i.e. able to be allocated an equal share) may be set as non-specific allocation instruments and the remainder may be adjusted accordingly. Similar operations may be performed following other operations (e.g. following the addition of a non-specific payment instrument or an adjustment that decreases the amount of an equal share of the remainder).

Returning to 420 (which may be reached when the instrument type is determined to be an electronic payment account using the payment service of the computing devices 112), the payment module may query another portion of the payment service for the payable type associated with the electronic payment account (e.g. whether the electronic payment account should be treated as capped or uncapped). Alternatively, the payment module may make the determination by referring to the user account information 156 in the database 154. For example, if the electronic payment is made from a user account with the payment service that has a prepaid balance, the electronic payment may be determined to be of the capped type with a subsequently determined instrument balance equal to the remainder of the prepaid value. On the other hand, if the electronic payment is made from a user account with the payment service using a credit card associated with the electronic payment account, the electronic payment account may be determined to be of the uncapped type. Once the handling of the electronic payment account is determined, the process continues to 418 and continues as described above.

Returning to 412 (which may be reached when the input type is determined to be the addition of one or more items to the open ticket transaction), the payment module receives the input of the one or more items requested by the customers from the merchant. The process then continues to 438.

At 438, the payment module adds the one or more received items to the open ticket. At 440, the payment module determines an updated total. Using the updated total and the specific allocations, the payment module determines the non-specific remainder of the total to be split between the non-specific allocation instruments.

At 442, the payment module reallocates the non-specific remainder among the non-specific payment instruments. At 444, the payment module determines any non-specific payment instruments that are, as a result of the increase in the total, allocated more than the current authorization value or instrument balance of the instrument. The payment module may reprocess capped instruments determined to have an instrument balance less than an equal share of the updated remainder as automated specific allocation instruments in a similar manner to that discussed above with regard to block 430. Once the capped instruments are processed, the payment module may attempt authorizations on the uncapped instruments allocated more than the instruments' current authorization values. At 446, the payment module may determine updated authorization value(s) for the non-specific payment instruments for which the authorization(s) were successful. If any authorization was unsuccessful, the payment module may flag the open ticket transaction for manual intervention and notify the merchant of the instruments for which the attempted authorization failed. Subsequent to 446, the process returns to 404 of FIG. 4A.

Returning to 414 (which may be reached when the input type is determined to be an allocation adjustment input), the payment module receives an indication of the instrument to receive the allocation adjustment. The process then continues to 448.

At 448, if the identified instrument is currently set as a non-specific allocation payment instrument, the identified instrument may be set as a manual specific allocation payment instrument. The payment module then allocates the amount indicated by the allocation adjustment input by the merchant to the identified payment instrument. If the amount allocated to the identified instrument is greater than previously allocated, the payment module may determine if the amount allocated is more than the current authorization value or instrument balance of the identified instrument, depending on the instrument type. If the identified instrument is an uncapped instrument and the amount allocated is greater than the current authorization value, the payment module may attempt an authorization on the identified instruments. If the authorization was successful, the payment module may determine an updated authorization value for the identified instruments. If the authorization is unsuccessful, the payment module may flag the open ticket transaction for manual intervention and notify the merchant of the authorization failure. Similarly, if the identified instrument is a capped instrument and the amount allocated is greater instrument balance, the payment module may flag the open ticket transaction for manual intervention and notify the merchant of the insufficiency of the instrument balance.

At 450, the payment module reallocates the non-specific remainder among the non-specific payment instruments. If the non-specific remainder has increased due to the allocation adjustment, authorizations may be attempted and updated authorization values may be determined for any payment instrument for which an equal share of the remainder is greater than or equal to the instrument's current authorization value. Such operations may be performed in a similar manner to those discussed above.

At 452, if the amount to be allocated to the identified payment instrument is more than previously allocated to the identified instrument, the payment module may reprocess any capped instruments that are set as automated specific allocation payment instruments. Specifically, because the remainder has decreased, an equal share allocated to such capped instruments may now be less than the instrument balances thereof. At 454, if the amount to be allocated to the identified payment instrument is less than previously allocated to the identified instrument, the payment module may reprocess any capped payment instruments that are non-specific allocation payment instruments. Specifically, because the remainder has increased, the equal share allocated to such capped instruments may exceed the instruments balances thereof. As such, the payment module may determine if the equal share of the remainder exceeds the instrument balance of any capped payment instrument that is a non-specific allocation payment instrument, and, if necessary, set such capped payment instruments as automated specific allocation instruments and allocate to the instruments the respective instrument balances thereof. Should the amount of the remainder change at either 452 or 454, the process may return to 450 (not shown). Otherwise, the process returns to 404 of FIG. 4A.

Returning to 416 (which may be reached when the merchant indicates the open ticket transaction is complete), the payment service attempts to execute the transaction. For example, the payment service may interact with the card payment network(s), bank computing device(s), payment service(s), and so on associated with the payment instruments to execute the transaction. More particularly, some implementations may allow the merchant to obtain a signature from the customers associated with the payment instruments to be processed, perform any additional authorization operations needed with the card payment network for the final allocated amounts, and print receipt(s) for the customers. The signature/authorization/receipt process may be performed serially (e.g. obtain one signature, authorize the associated payment instrument and print receipt and repeat for each additional instrument) or in parallel (e.g. obtain a plurality of signatures, authorize the associated payment instrument(s) for the final allocated amounts and print receipts).

The process 400 described above is only an example provided for discussion purposes. For example, the determinations at 408, 410 and 418 are merely examples and other or additional determinations or options may be included in other implementations. In a particular example variation, additional types of payment instruments may be added to the determination at 410 and similar handling may be provided for the additional types of payment instruments.

In another example variation, some implementations may provide for the option to exit from the bill splitting operation temporarily to execute the payment transaction for one or more of the payment instruments before returning to the bill splitting operation for the remaining payment instruments. For example, some implementations may allow the merchant to obtain a signature from the customer associated with the payment instrument to be processed, perform an authorization operation with the card payment network, and print a receipt for the customer before returning to the bill splitting operation for the remaining payment instruments.

In the example illustrated in FIGS. 3A-4D, authorization is attempted for any non-specific allocation payment instrument when the authorization value of an individual payment instrument is exceeded by an equal share of the remainder. In other implementations, rather than allocating the remainder equally, the payment module may allocate the remainder equally until a authorization value is reached, allocate the authorization value to that instrument, and continue to allocate a greater than equal share to those payment instruments whose authorization value has not been reached. In such implementations, authorizations are not performed until all of the non-specific allocation payment instruments are reached. Once the remainder has exceeded the total of the authorization values of the non-specific allocation payment instruments, the manner the process continues may vary from implementation to implementation. For example, in some implementations, authorizations may be attempted for all of the non-specific allocation payment instruments and new authorization values may be determined. In other implementations, authorizations may be attempted for one or more non-specific allocation payment instruments which may be selected based on various selection schemes. Some examples of the selection schemes include a rotation based scheme in which the non-specific allocation payment instruments are selected in turn and a scheme which attempts to avoid substantial imbalance in amounts allocated to the payment instruments. In another variation, the payment module may allocate the remainder in the manner described with regard to FIG. 3A-4D but perform authorizations based on the total authorization value as discussed here.

In another variation, the payment module may include a multiple payment instrument entry option in which payment reallocation is not performed between, for example, swiping of the payment cards. Rather, until the merchant indicates that all payment instruments currently provided by the customers have been added to the open ticket, the payment division operations are postponed. In some implementations, this may avoid the need for a large authorization to be performed for the first instrument input due to the first instrument being allocated the entirety of the cost of the open ticket transaction until the second payment instrument is input. For example, if the cost of the open ticket transaction is $150 before a payment instrument is provided (e.g. due to the merchant's knowledge of the three customers), the first instrument input is allocated the entire amount and may be declined if the payment instrument is, for example, a credit card with only $100 remaining on the card's credit limit. In the aforementioned variation, by postponing bill splitting and authorization operations until all three payment instruments are input, the equal share of the remainder initially queried for the first instrument may be reduced from $150 to $50.

In still another variation, the POS module or the merchant device in general may operate to perform more or all of the operations discussed in FIGS. 3A-4D. For example, the POS module may perform the open ticket operations including maintaining the item total, performing bill splitting operations, and performing authorizations. In some such implementations, the POS module may request the authorization values from the authorization value module 152 of the payment service. Of course, these are merely examples and many other divisions of work between the merchant device and payment service may be envisioned in view of this disclosure.

In addition, some implementations may provide for various methods of weighting the division of the remainder. For example, in some such implementations, payment instruments may be input multiple times (e.g. a payment card may be swiped multiple times) and the bill splitting may be weighted based on the number of times the various payment methods are input. Numerous other variations are possible.

As previously stated, each of the above discussed scenarios is merely an example and many variations are possible. Moreover, many variations of the techniques discussed above are possible as well without departing from the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
 receiving, via a device, payment information associated with a payment instrument provided by a user in association with an event having a value, the device executing an instance of an application configuring the device as a point-of-sale (POS) terminal, the instance of the application configuring the POS terminal to transmit at least the payment information, received via a payment reader coupled to the device, to a payment service;

determining, prior to processing the payment instrument for the event, an authorization value associated with the payment instrument;

monitoring, by the application, changes to the value over a period of time;

in response to the changes, determining, by the application, a different value associated with the event;

determining that a trigger event has occurred, the trigger event indicating the different value is more than the authorization value associated with the payment instrument associated with the event; and processing, at least in part by the application using the payment information and based at least in part on the trigger event occurring, a payment for at least an amount corresponding to a difference between the value and the different value.

2. The method as claim 1 recites, wherein the event corresponds to an open ticket and the period of time is associated with a duration of the open ticket.

3. The method as claim 1 recites, wherein the event corresponds to an open ticket and the period of time extends beyond execution of a payment transaction associated with the open ticket.

4. The method as claim 1 recites, wherein the event corresponds to an open ticket and the changes comprise at least one of an addition of an item to the open ticket or a removal of an item from the open ticket.

5. The method as claim 1 recites, further comprising:

receiving additional payment information associated with an additional payment instrument; and wherein processing the payment for the difference between the value and the different value is based at least in part on attempting to authorize at least the payment instrument and the additional payment instrument for at least the amount corresponding to the difference between the value and the different value.

6. A system comprising:

one or more processors; and one or more computer-readable instructions, that when executed by the one or more processors, cause the one or more processors to perform operations comprising:

receiving payment information associated with a payment instrument provided by a user in association with an event having a value;

determining, prior to processing the payment instrument for the event, an authorization value associated with the payment instrument;

monitoring changes to the value over a period of time;

in response to the changes, determining a different value associated with the event;

determining that a trigger event has occurred with respect to an attempt to authorize at least the payment instrument, the trigger event based at least in part on the authorization value; and processing a payment based at least in part on the trigger event occurring, using the payment information, for at least an amount corresponding to a difference between the value and the different value.

7. The system as claim 6 recites, wherein the value is less than the authorization value associated with the payment instrument and the different value is greater than or equal to the authorization value.

8. The system as claim 6 recites, wherein the event corresponds to an open ticket and the period of time is associated with a duration of the open ticket.

9. The system as claim 6 recites, wherein the event corresponds to an open ticket and the period of time extends beyond execution of a payment transaction associated with the open ticket.

10. The system as claim 6 recites, wherein the event corresponds to an open ticket and the changes comprise at least one of an addition of an item to the open ticket or a removal of an item from the open ticket.

11. The system as claim 6 recites, the operations further comprising:

receiving additional payment information associated with an additional payment instrument; and wherein processing the payment for the difference between the value and the different value is based at least in part on attempting to authorize at least the payment instrument and the additional payment instrument for at least the amount corresponding to the difference between the value and the different value.

12. The system as claim 11 recites, the operations further comprising splitting the amount between the payment instrument and the additional payment instrument.

13. The system as claim 11 recites, the operations further comprising:

allocating the value between the payment instrument and the additional payment instrument;

in response to determining the different value of the event, updating allocated values between the payment instrument and the additional payment instrument to generate updated allocated values; and wherein processing the payment includes utilizing the updated allocated values to process the payment.

14. The system as claim 6 recites, wherein the trigger event indicates that the different value is more than the authorization value associated with the payment instrument associated with the event.

15. The system as claim 6 recites, wherein the trigger event indicates the association of a second payment instrument with the event.

16. The system as claim 6 recites, wherein the trigger event includes determining that the payment instrument is a capped payment instrument having a maximum monetary amount that may be utilized for transactions.

17. The system as claim 6 recites, wherein the trigger event includes determining that an updated authorization value associated with the payment instrument is less than the authorization value.

18. The system as claim 6 recites, wherein the trigger event is further based on a second payment instrument associated with the event being authorized.

19. The system as claim 6 recites, wherein the trigger event includes receiving user input in response to a merchant notification associated with the event.

\* \* \* \* \*